(12) United States Patent
Lee et al.

(10) Patent No.: US 11,376,981 B2
(45) Date of Patent: Jul. 5, 2022

(54) SYSTEMS AND METHODS FOR ADAPTIVE EV CHARGING

(71) Applicant: California Institute of Technology, Pasadena, CA (US)

(72) Inventors: Zachary J. Lee, Pasadena, CA (US); Tongxin Li, Pasadena, CA (US); Steven H. Low, La Canada, CA (US); Sunash B. Sharma, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 172 days.

(21) Appl. No.: 16/786,803

(22) Filed: Feb. 10, 2020

(65) Prior Publication Data

US 2020/0254896 A1 Aug. 13, 2020

Related U.S. Application Data

(60) Provisional application No. 62/803,157, filed on Feb. 8, 2019, provisional application No. 62/964,504, filed on Jan. 22, 2020.

(51) Int. Cl.
*B60L 53/62* (2019.01)
*B60L 53/64* (2019.01)
(Continued)

(52) U.S. Cl.
CPC ............... *B60L 53/62* (2019.02); *B60L 53/51* (2019.02); *B60L 53/60* (2019.02); *B60L 53/63* (2019.02);
(Continued)

(58) Field of Classification Search
CPC ........ B60L 53/51; B60L 53/62; B60L 53/643; B60L 53/64; B60L 53/67; B60L 53/68;
(Continued)

(56) References Cited

U.S. PATENT DOCUMENTS 5,677,924 A 10/1997 Bestwick
6,625,520 B1 9/2003 Chen et al.
(Continued)

FOREIGN PATENT DOCUMENTS

CN 103241130 A 8/2013
EP 3179421 A1 6/2017
(Continued)

OTHER PUBLICATIONS

"Climate Change Investment Plan", S. of California, 2018.
(Continued)

*Primary Examiner* — Richard Isla
*Assistant Examiner* — Johali A Torres Ruiz
(74) *Attorney, Agent, or Firm* — KPPB LLP

(57) ABSTRACT

Systems and methods in accordance with embodiments of the invention impalement adaptive electric vehicle (EV) charging. One embodiment includes one or more electric vehicle supply equipment (EVSE); an adaptive EV charging platform, including a processor; a memory containing: an adaptive EV charging application; a plurality of EV charging parameters. In addition, the processor is configured by the adaptive EV charging application to: collect the plurality of EV charging parameters from one or more EVSEs, simulate EV charging control routines and push out updated EV
(Continued)

charging control routines to the one or more EVSEs. Additionally, the adaptive EV charging platform is configured to control charging of EVs based upon the plurality of EV charging parameters collected from at least one EVSE.

16 Claims, 19 Drawing Sheets

(51) Int. Cl.
  *B60L 53/51* (2019.01)
  *B60L 53/63* (2019.01)
  *B60L 53/60* (2019.01)
  *B60L 53/67* (2019.01)
  *B60L 53/68* (2019.01)

(52) U.S. Cl.
  CPC .............. *B60L 53/64* (2019.02); *B60L 53/67* (2019.02); *B60L 53/68* (2019.02); Y02T 10/70 (2013.01); Y02T 10/7072 (2013.01); Y02T 90/12 (2013.01); Y02T 90/16 (2013.01); Y02T 90/167 (2013.01); Y04S 30/12 (2013.01)

(58) Field of Classification Search
  CPC .......... B60L 53/60; Y02T 90/12; Y02T 90/16; Y02T 90/167; Y02T 90/168; Y02T 10/70; Y02T 10/7072; Y04S 30/12
  See application file for complete search history.

(56) References Cited

U.S. PATENT DOCUMENTS

| | | | |
|---|---|---|---|
| 7,076,360 B1 | 7/2006 | Ma | |
| 7,852,050 B2 | 12/2010 | Berggren et al. | |
| 8,013,570 B2 | 9/2011 | Baxter et al. | |
| 8,346,401 B2 | 1/2013 | Pollack et al. | |
| 8,407,016 B2 | 3/2013 | Slota et al. | |
| 8,754,627 B1 | 6/2014 | Le | |
| 8,972,074 B2 | 3/2015 | Marasanapalle et al. | |
| 9,024,580 B2 | 5/2015 | Wu et al. | |
| 9,093,844 B2 | 7/2015 | Yonezawa et al. | |
| 9,112,382 B2 | 8/2015 | Aisu et al. | |
| 9,148,027 B2 | 9/2015 | Shane et al. | |
| 9,153,966 B2 | 10/2015 | Ishida | |
| 9,168,841 B2 | 10/2015 | Kawai et al. | |
| 9,225,171 B2 | 12/2015 | Chen et al. | |
| 9,248,755 B2 | 2/2016 | Sun et al. | |
| 9,335,748 B2 | 5/2016 | Francino et al. | |
| 9,418,318 B2 | 8/2016 | Nadar et al. | |
| 9,564,757 B2 | 2/2017 | Wang et al. | |
| 9,703,308 B2 | 7/2017 | Claessens et al. | |
| 9,760,957 B2 | 9/2017 | Hug et al. | |
| 9,863,985 B2 | 1/2018 | Giannakis et al. | |
| 9,954,362 B2 | 4/2018 | Low et al. | |
| 10,065,520 B2 | 9/2018 | Zhang et al. | |
| 10,158,229 B2 | 12/2018 | Gan et al. | |
| 10,198,018 B2 | 2/2019 | Gan et al. | |
| 10,317,970 B2 | 6/2019 | Peng et al. | |
| 10,320,203 B2 | 6/2019 | Low et al. | |
| 10,926,659 B2 | 2/2021 | Lee et al. | |
| 11,171,509 B2 | 11/2021 | Lee et al. | |
| 2008/0004721 A1 | 1/2008 | Huff et al. | |
| 2008/0005597 A1 | 1/2008 | Kern et al. | |
| 2008/0077368 A1 | 3/2008 | Nasle | |
| 2008/0281663 A1* | 11/2008 | Hakim | B60L 53/305 705/7.25 |
| 2009/0261779 A1 | 10/2009 | Zyren | |
| 2010/0134067 A1 | 6/2010 | Baxter et al. | |
| 2010/0217550 A1 | 8/2010 | Crabtree et al. | |
| 2010/0280675 A1 | 11/2010 | Tate, Jr. et al. | |
| 2011/0043220 A1 | 2/2011 | Leibowitz et al. | |
| 2011/0153474 A1 | 6/2011 | Tormey et al. | |
| 2011/0169461 A1 | 7/2011 | Deaver, Sr. | |
| 2012/0029720 A1 | 2/2012 | Cherian et al. | |
| 2012/0044843 A1 | 2/2012 | Levy et al. | |
| 2012/0049793 A1 | 3/2012 | Ross et al. | |
| 2012/0074893 A1 | 3/2012 | Cole | |
| 2012/0098481 A1 | 4/2012 | Hunter et al. | |
| 2012/0109443 A1* | 5/2012 | Takahashi | B60L 58/19 701/22 |
| 2012/0180064 A1 | 7/2012 | Helander | |
| 2012/0200160 A1 | 8/2012 | Pratt et al. | |
| 2012/0200256 A1 | 8/2012 | Tse | |
| 2012/0203388 A1 | 8/2012 | DiLuciano et al. | |
| 2012/0316691 A1 | 12/2012 | Boardman et al. | |
| 2012/0326503 A1 | 12/2012 | Birkelund et al. | |
| 2013/0020993 A1 | 1/2013 | Taddeo et al. | |
| 2013/0057210 A1 | 3/2013 | Nergaard et al. | |
| 2013/0110296 A1 | 5/2013 | Khoo et al. | |
| 2013/0201316 A1 | 8/2013 | Binder et al. | |
| 2013/0211988 A1 | 8/2013 | Dorn et al. | |
| 2013/0226637 A1* | 8/2013 | Bozchalui | G06Q 10/06 705/7.12 |
| 2013/0238148 A1 | 9/2013 | Legbedji et al. | |
| 2013/0268131 A1 | 10/2013 | Venayagamoorthy et al. | |
| 2013/0274941 A1 | 10/2013 | Khozikov et al. | |
| 2014/0025352 A1 | 1/2014 | Ghosh et al. | |
| 2014/0032007 A1 | 1/2014 | Claessens et al. | |
| 2014/0060065 A1 | 3/2014 | Sweet et al. | |
| 2014/0070606 A1 | 3/2014 | Gibeau | |
| 2014/0089016 A1 | 3/2014 | Smullin et al. | |
| 2014/0097683 A1 | 4/2014 | Piyabongkarn et al. | |
| 2014/0125280 A1 | 5/2014 | Sun et al. | |
| 2014/0167985 A1 | 6/2014 | Halnais et al. | |
| 2014/0232337 A1 | 8/2014 | Namou et al. | |
| 2014/0266042 A1 | 9/2014 | Storm | |
| 2014/0312839 A1 | 10/2014 | Uyeki | |
| 2014/0316604 A1 | 10/2014 | Ortjohann et al. | |
| 2014/0379157 A1 | 12/2014 | Das et al. | |
| 2015/0009047 A1 | 1/2015 | Ashkenazi et al. | |
| 2015/0025696 A1 | 1/2015 | Hug et al. | |
| 2015/0051744 A1 | 2/2015 | Mitra | |
| 2015/0120109 A1 | 4/2015 | Cun | |
| 2015/0137768 A1 | 5/2015 | Kishiyama et al. | |
| 2015/0165924 A1 | 6/2015 | Cho et al. | |
| 2015/0291044 A1 | 10/2015 | Adachi et al. | |
| 2015/0317589 A1* | 11/2015 | Anderson | G06N 20/20 705/7.25 |
| 2015/0340863 A1 | 11/2015 | Qiuyu et al. | |
| 2015/0346698 A1 | 12/2015 | Mailloux et al. | |
| 2015/0346753 A1 | 12/2015 | Gan et al. | |
| 2015/0367740 A1 | 12/2015 | Mcgrath et al. | |
| 2016/0009192 A1 | 1/2016 | Zhang et al. | |
| 2016/0031338 A1 | 2/2016 | Penilla et al. | |
| 2016/0036225 A1 | 2/2016 | Zhao et al. | |
| 2016/0036226 A1 | 2/2016 | Gan et al. | |
| 2016/0047862 A1 | 2/2016 | Shimizu et al. | |
| 2016/0121748 A1 | 5/2016 | Wytock et al. | |
| 2016/0214489 A1 | 7/2016 | Giusti et al. | |
| 2016/0248254 A1 | 8/2016 | Huomo et al. | |
| 2016/0254669 A1 | 9/2016 | Zhang et al. | |
| 2016/0315807 A1 | 10/2016 | Peng et al. | |
| 2017/0110895 A1 | 4/2017 | Low et al. | |
| 2017/0246961 A1 | 8/2017 | Lee et al. | |
| 2019/0184850 A1 | 6/2019 | Lee et al. | |
| 2019/0202299 A1* | 7/2019 | Oh | H02J 7/007 |
| 2021/0276447 A1* | 9/2021 | Kumar | B60L 53/68 |

FOREIGN PATENT DOCUMENTS

| | | |
|---|---|---|
| EP | 3718073 A1 | 10/2020 |
| GB | 2505929 A | 3/2014 |
| JP | 2012034452 A | 2/2012 |
| JP | 2012083989 A | 4/2012 |
| KR | 101225052 B1 | 1/2013 |
| KR | 101566715 B1 | 11/2015 |
| WO | 2012015507 A1 | 2/2012 |
| WO | 2012058114 A2 | 5/2012 |
| WO | 2012167383 A1 | 12/2012 |
| WO | 2014075108 A2 | 5/2014 |
| WO | 2015179873 A1 | 11/2015 |
| WO | 2015184188 A1 | 12/2015 |
| WO | 2016007910 A1 | 1/2016 |

(56) References Cited

FOREIGN PATENT DOCUMENTS

| WO | 2016022603 A1 | 2/2016 |
|----|---------------|--------|
| WO | 2016172348 A1 | 10/2016 |
| WO | 2017066790 A1 | 4/2017 |
| WO | 2017147612 A1 | 8/2017 |
| WO | 2019109084 A1 | 6/2019 |
| WO | 2020163873 A1 | 8/2020 |

OTHER PUBLICATIONS

Carpentier, J., "Contribution to the economic dispatch problem", Bulletin de la Societe Francoise des Electriciens, vol. 3, No. 8, 1962, pp. 431-447.

Lindsay et al., "Mixture Models: Theory, Geometry and Applications", NSF-CBMS Regional Conference Series in Probability and Statistics, vol. 5, 1995, 171 pgs. (Presented in two parts).

Liu et al., "Decentralized Multi-Agent System-Based Cooperative Frequency Control for Autonomous Microgrids With Communication Constraints", IEEE Transactions on Sustainable Energy, vol. 5, No. 2, Apr. 2014, pp. 446-456.

Low, "Convex Relaxation of Optimal Power Flow Part I: Formulations and Equivalence", arXiv.org, Retrieved from: https://arxiv.org/abs/1405.0766, May 5, 2014, 44 pgs.

Low, "Convex Relaxation of Optimal Power Flow—Part II: Exactness", IEEE Transactions on Control of Network Systems, vol. 1, No. 2, Jun. 2014, pp. 177-189.

Low et al., "Optimization Flow Control—I: Basic Algorithm and Convergence", IEEE/ACM Transactions on Networking, vol. 7, No. 6, Dec. 1999, pp. 861-874.

Lu et al., "Design Considerations for Frequency Responsive Grid Friendly Appliances", 2005/2006 IEEE/PES Transmission and Distribution Conference and Exhibition, May 21-24, 2006, pp. 1-6.

Lu et al., "Nonlinear stabilizing control of multimachine systems", IEEE Transactions on Power Systems, vol. 4, No. 1, Feb. 1989, pp. 236-241.

Lucas et al., "Indicator-Based Methodology for Assessing EV Charging Infrastructure Using Exploratory Data Analysis", Energies, vol. 11, No. 7, No. 1869, Jul. 18, 2018, pp. 1-18, DOI: 10.3390/en11071869.

Lygeros et al., "Dynamical Properties of Hybrid Automata", IEEE Transactions on Automatic Control, vol. 48, No. 1, Jan. 31, 2003, pp. 2-17.

Ma et al., "Decentralized Charging Control for Large Populations of Plug-In Electric Vehicles", 49th IEEE Conference on Decision and Control (CDC), Dec. 15-17, 2010, pp. 206-212.

Ma et al., "Decentralized Charging Control of Large Populations of Plug-in Electric Vehicles", IEEE Transactions on Control Systems Technology, vol. 21, No. 1, Jan. 2013, pp. 67-78.

Mallada et al., "Distributed Frequency-Preserving Optimal Load Control", Proceedings of the 19th World Congress, The International Federation of Automatic Control, Aug. 24-29, 2014, pp. 5411-5418.

Mallada et al., "Fair load-side control for frequency regulation in smart grids", Proc. of Allerton Conference on Communication, Control, and Computing, 2014, 10 pgs.

Mallada et al., "Optimal load-side control for frequency regulation in smart grids", 52nd Annual Allerton Conference on Communication, Control, and Computing, Oct. 1-3, 2014, pp. 731-738.

Min et al., "A trust region interior point algorithm for optimal power flow problems", Electrical Power and Energy Systems, vol. 27, No. 4, May 2005, pp. 293-300.

Molina-Garcia et al., "Decentralized Demand-Side Contribution to Primary Frequency Control", IEEE Transactions on Power Systems, vol. 26, No. 1, Feb. 2011, pp. 411-419.

Momoh et al., "A Review of Selected Optimal Power Flow Literature to 1993. Part I: NonLinear and Quadratic Programming Approaches", IEEE Transactions on Power Systems, vol. 14, No. 1, Feb. 1999, pp. 96-104.

Moon et al., "The Development of Equivalent System Technique for Deriving an Energy Function Reflecting Transfer Conductances", IEEE Transactions on Power Systems, vol. 14, No. 4, Nov. 1999, pp. 1335-1341.

Mukherjee et al., "A Review of Charge Scheduling of Electric Vehicles in Smart Grid", IEEE Systems Journal, vol. 9, No. 4, Dec. 2015, pp. 1541-1553.

Nakahira et al., "Smoothed Least-laxity-first Algorithm for EV Charging", e-Energy'17: Proceedings of the $8^{th}$ International Conference on Future Energy Systems, May 2017, 10 pgs.

Nichols et al., "General Service Time-of-Use, Electric Vehicle Charging Demand Metered", Southern California Edison, Mar. 2019, 7 pgs.

O'Neill et al., "The IV Formulation and Linear Approximations of the AC Optimal Power Flow Problem", Optimal Power Flow Paper 2, Dec. 2012, 18 pgs.

Ortega et al., "Transient Stabilization of Multimachine Power Systems with Nontrivial Transfer Conductances", IEEE Transactions on Automatic Control, vol. 50, No. 1, Jan. 2005, pp. 60-75.

Overbye et al., "A Comparison of the AC and DC Power Flow Models for LMP Calculations", 37th Annual Hawaii International Conference on System Sciences, Jan. 5-8, 2004, 9 pgs.

P.S. Inc., "Dataport", 2019, 3 pgs.

Palomar et al., "A Tutorial on Decomposition Methods for Network Utility Maximization", IEEE Journal on Selected Areas in Communications, vol. 24, No. 8, Aug. 2006, pp. 1439-1451.

Pandya et al., "A survey of optimal power flow methods", Journal of Theoretical and Applied Information Technology, vol. 4, No. 5, 2008, pp. 450-458.

Pedregosa et al., "Scikit-learn: Machine Learning in Python", Journal of Machine Learning Research, vol. 12, Oct. 2011, pp. 2825-2830.

Peng et al., "Distributed Algorithm for Optimal Power Flow on A Radial Network", 53rd IEEE Conference on Decision and Control, Dec. 15-17, 2014, pp. 167-172.

Peng et al., "Feeder Reconfiguration in Distribution Networks based on Convex Relaxation of OPF", IEEE Transactions on Power Systems, vol. 30, No. 4, Jul. 2015, pp. 1793-1804.

Petroff, "These countries want to ditch gas and diesel cars", CNN Business, Jul. 26, 2017, Retrieved from: https://money.cnn.com/2017/07/26/autos/countries-that-are-banning-gas-cars-for-electric/index.html, 3 pgs.

Phan et al., "Distributed Methods for Solving the Security-Constrained Optimal Power Flow Problem", IEEE PES Innovative Smart Grid Technologies (ISGT), 2012, Jan. 16-20, 2012, 7 Pgs.

Purchala et al., "Usefulness of DC Power Flow for Active Power Flow Analysis", IEEE Power Engineering Society General Meeting, Jun. 16, 2005, pp. 1-6.

Putrus et al., "Impact of Electric Vehicles on Power Distribution Networks", 2019 IEEE Vehicle Power and Propulsion Conference, Sep. 7-10, 2009, 5 pgs., DOI: 10.1109/VPPC.2009.5289760.

Qu et al., "Application of Robust Control to Sustained Oscillations in Power Systems", IEEE Transactions on Circuits and Systems—I: Fundamental Theory and Applications, vol. 39, No. 6, Jun. 1992, pp. 470-476.

Ramanujam et al., "Quantifying the Impact of Electric Vehicles on the Electric Grid—A Simulation Based Case-Study", e-Energy '17: Proceedings of the Eighth International Conference on Future Energy Systems, pp. 228-233, https://doi.org/10.1145/3077839.3077854.

Rezaei et al., "Packetized Plug-In Electric Vehicle Charge Management", IEEE Transactions on Smart Gird, vol. 5, No. 2, Mar. 2014, pp. 1-9, doi:10.1109SG/TSG.2013.2281384.

Rivera et al., "Distributed Convex Optimization for Electric Vehicle Aggregators", IEEE Transactions on Smart Grid, vol. 8, No. 4, Jul. 2017, pp. 1852-1863, DOI: 10.1109/TSG.2015.2509030.

Rotering et al., "Optimal Charge Control of Plug-In Hybrid Electric Vehicles in Deregulated Electricity Markets", IEEE Transactions on Power Systems, vol. 26, No. 3, Aug. 2011, pp. 1021-1029.

Schuller et al., "Quantifying load flexibility of electric vehicles for renewable energy integration", Applied Energy, vol. 151, Aug. 1, 2015, pp. 335-344, https://doi.org/10.1016/j.apenergy.2015.04.004.

Schweppe et al., "Homeostatic Utility Control", IEEE Transactions on Power Apparatus and Systems, vol. PAS-99, No. 3, May-Jun. 1980, pp. 1151-1163.

(56) References Cited

OTHER PUBLICATIONS

Shafiee et al., "Distributed Secondary Control for Islanded Microgrids—A Novel Approach", IEEE Transactions on Power Electronics, vol. 29, No. 2, Feb. 2014, pp. 1018-1031.
Short et al., "Stabilization of Grid Frequency Through Dynamic Demand Control", IEEE Transactions on Power Systems, vol. 22, No. 3, Aug. 2007, pp. 1-9.
Siljak et al., "Robust Decentralized Turbine/Governor Control Using Linear Matrix Inequalities", IEEE Transactions on Power Systems, vol. 17, No. 3, Aug. 2002, pp. 715-722.
Simpson-Porco et al., "Stability, Power Sharing, & Distributed Secondary Control in Droop-Controlled Microgrids", 2013 IEEE International Conference on Smart Grid Communications (SmartGridComm), Oct. 21-24, 2013, pp. 672-677.
Simpson-Porco et al., "Synchronization and Power Sharing for Droop-Controlled Inverters in Islanded Microgrids", arXiv.org, Retrieved from: https://arxiv.org/abs/1206.5033, Feb. 21, 2013, 11 pgs.
Sousa et al., "Robust Optimal Power Flow Solution Using Trust Region and Interior-Point Methods", IEEE Transactions on Power Systems, vol. 26, No. 2, May 2011, pp. 487-499.
Srinivasa et al., "HERB: a home exploring robotic butler", Autonomous Robots, vol. 28, 2010, pp. 5-20.
Stott et al., "DC Power Flow Revisited", IEEE Transactions on Power Systems, vol. 24, No. 3, Aug. 2009, pp. 1290-1300.
Stott et al., "Fast decoupled load flow", IEEE Transactions on Power Apparatus and Systems, vol. PAS-93, No. 3, May 1974, pp. 859-869.
Sturm, "Using SeDuMi 1.02, a matlab toolbox for optimization over symmetric cones", Optimization Methods and Software, vol. 11-12, No. 1- 4, Mar. 1999, pp. 625-653.
Sun et al., "Fully Decentralized AC Optimal Power Flow Algorithms", 2013 IEEE Power & Energy Society General Meeting, Jul. 21-25, 2013, 5 pgs.
Eirola et al., "Gaussian Mixture Models for Time Series Modelling, Forecasting, and Interpolation", International Symposium of Intelligent Data Analysis, Springer, Oct. 2013, 12 pgs., doi:10.1007/978-3-642-41398-8_15.
Engel et al., "Charging Ahead: Electric-Vehicle Infrastructure Demand", McKinsey Center for Future Mobility, Oct. 2018, pp. 1-8, https://www.mckinsey.com/industries/automotive-and-assembly/our-insights/charging-ahead-electric-vehicle-infrastructure-demand, accessed: May 3, 2019.
Farivar et al., "Branch Flow Model: Relaxations and Convexification (Parts I, II)", IEEE Transactions on Power Systems, arXiv.org, Retrieved from: https://arxiv.org/abs/1204.4865, Apr. 11, 2013, 21 pgs.
Farivar et al., "Inverter VAR Control for Distribution Systems with Renewables", 2011 IEEE International Conference on Smart Grid Communications (SmartGridComm), Oct. 17-20, 2011, pp. 457-462.
Farivar et al., "Optimal Inverter VAR Control in Distribution Systems with High PV Penetration", PES General Meeting, Jul. 22-26, 2012, pp. 1-7.
Farivar et al., "Branch Flow Model relaxations, convexification", Computing +Math Sciences Electrical Engineering, Caltech, May 2012, 69 pgs.
Feijer et al., "Stability of primal-dual gradient dynamics and applications to network optimization", Automatica, vol. 46, No. 12, Dec. 2010, pp. 1974-1981.
Fitzgerald et al., "EVGO Fleet and Tariff Analysis, PhaseI: California", Rocky Mountain Institute, Mar. 2017, 31 pgs.
Flammini et al., "Statistical characterisation of the real transaction data gathered from electric vehicle charging stations", Electric Power Systems Research, vol. 166, Jan. 2019, pp. 136-150, https://doi.org.10.1016/j.epsr.2018.09.022.
Frade et al., "Optimal Location of Charging Stations for Electric Vehicles in a Neighborhood in Lisbon, Portugal", Transportation Research Record: Journal of the Transportation Research Board, vol. 2252, No. 1, 2011, pp. 91-98.

Frank et al., "Optimal power flow: a bibliographic survey I, Formulations and deterministic methods", Energy Systems, 2012, vol. 3, No. 3, pp. 221-258.
Fu et al., "U.S. Solar Photovoltaic System Cost Benchmark: Q1 2018", Technical Report NREL/TP-6A20-72399, Nov. 2018, 63 pgs.
Fukuda et al., "Exploiting sparsity in semidefinite programming via matrix completion I: General framework", SIAM Journal on Optimization, vol. 11, No. 3, 2011, pp. 647-674.
Gan et al., "Convex Relaxations and Linear Approximation for Optimal Power Flow in Multiphase Radial Networks", 2014 Power Systems Computation Conference, Aug. 18-22, 2014, 9 pgs.
Gan et al., "Exact Convex Relaxation of Optimal Power Flow in Radial Networks", IEEE Transactions on Automatic Control, vol. 60, No. 1, Jan. 2015, pp. 72-87.
Gan et al., "Optimal Decentralized Protocol for Electric Vehicle Charging", 2011 50th IEEE Conference on Decision and Control and European Control Conference, Dec. 12-15, 2011, pp. 5798-5804.
Gan et al., "Optimal Decentralized Protocols for Electric Vehicle Charging", IEEE Transactions on Power Systems, vol. 28, No. 2, May 2013, pp. 1-12, DOI: 10.1109/CDC.2011.6161220.
Gan et al., "Optimal Power Flow in Distribution Networks", arXiv.org, Retrieved from: https://arXiv:1208.4076, Dec. 2013, 7 pgs.
Ge et al., "The Planning of Electric Vehicle Charging Stations in the Urban Area", 2nd International Conference on Electronic & Mechanical Engineering and Information Technology (EMEIT—2012), Nov. 2012, pp. 1598-1604, DOI: 10.2991/emeit.2012.356.
Gong et al., "Study of PEV Charging on Residential Distribution Transformer Life", IEEE Transactions on Smart Grid, vol. 3, No. 1, Mar. 2012, pp. 404-412, https://doi.org/10.1109/TSG.2011.2163650.
Grant et al., "CVX: Matlab Software for Disciplined Convex Programming", Retrieved from: http://cvxr.com/cvx/, 2011, 2 pgs.
Guo et al., "Nonlinear decentralized control of large-scale power systems", Automatica, vol. 36, No. 9, Sep. 2000, pp. 1275-1289.
Guo et al., "Optimal Online Adaptive Electric Vehicle Charging", 2017 IEEE Power & Energy Society General Meeting, Jul. 16-20, 2017, 5 pgs.
Hammerstrom et al., "Pacific Northwest GridWise Testbed Demonstration Projects; Part II. Grid Friendly Appliance Project", Pacific Northwest National Laboratory, Technical Report No. PNNL-17079, Oct. 2007, 123 pgs.
He et al., "Optimal deployment of public charging stations for plug-in hybrid electric vehicles", Transportation Research Part B, vol. 47, Jan. 2013, pp. 87-101.
Hill et al., "Stability Analysis of Multimachine Power Networks with Linear Frequency Dependent Loads", IEEE Transactions on Circuits and Systems, vol. CAS-29, No. 12, Dec. 1982, pp. 840-848.
Huneault et al., "A Survey of The Optimal Power Flow Literature", IEEE Transactions on Power Systems, vol. 6, No. 2, May 1991, pp. 762-770.
Hutson et al., "Intelligent Scheduling of Hybrid and Electric Vehicle Storage Capacity in a Parking Lot for Profit Maximization in Grid Power Transactions", 2008 IEEE Energy 2030 Conference, Nov. 17-18, 2008, pp. 1-8, DOI: 10.1109/ENERGY.2008.4781051.
Ilic, "From Hierarchical to Open Access Electric Power Systems", Proceedings of the IEEE, vol. 95, No. 5, May 2007, pp. 1060-1084.
Iversen et al., "Optimal Charging of an Electric Vehicle Using a Markov Decision Process", arXiv.org, Retrieved from: https://arxiv.org/abs/1310.6926, Oct. 25, 2013, 30 pgs.
Jabr et al., "A Primal-Dual Interior-Point Method to Solve the Optimal Power Flow Dispatching Problem", Optimization and Engineering, vol. 4, No. 4, 2003, pp. 309-336.
Jabr, "Radial Distribution Load Flow Using Conic Programming", IEEE Transactions on Power Systems, vol. 21, No. 3, Aug. 2006, pp. 1458-1459.
Jakobsson, "On Some Extensions and Performance of Fast-Lipschitz Optimization", Master's Degree Project, Oct. 2011, 84 pgs.
Jiang et al., "Toward a Globally Robust Decentralized Control for Large-Scale Power Systems", IEEE Transactions on Control Systems Technology, vol. 5, No. 3, May 1997, pp. 309-319.

(56) References Cited

OTHER PUBLICATIONS

Jones-Albertus, "Confronting the Duck Curve: How to Address Over-Generation of Solar Energy", Department of Energy, Office of Energy Efficiency & Renewable Energy, Oct. 12, 2017, 7 pgs., Retrieved Mar. 28, 2020, https://www.energy.gov/eere/articles/confronting-duck-curve-how-address-over-generation-solar-energy.
Kelly et al., "Rate control for communication networks: shadow prices, proportional fairness and stability", Journal of the Operational Research Society, vol. 49, No. 3, Mar. 1998, 16 pgs.
Kersting, "Radial distribution test feeders", IEEE Transactions on Power Systems, vol. 6, No. 3, Aug. 1991, pp. 975-985.
Kersting et al., "Distribution System Modeling and Analysis", CRC Press, 2006, 329 pgs. (Presented in two parts).
Khaki et al., "A Hierarchical ADMM Based Framework for EV Charging Scheduling", 2018 IEEE/PES Transmission and Distribution Conference and Exposition (T&D), Apr. 2018, 5 pgs., DOI: 10.1109/TDC.2018.8440531.
Kiani et al., "A Hierarchical Transactive Control Architecture for Renewables Integration in Smart Grids", 51st IEEE Conference on Decision and Control, Dec. 10-13, 2012, pp. 4985-4990.
Kim et al., "Coarse-Grained Distributed Optimal Power Flow", IEEE Transactions on Power Systems, vol. 12, No. 2, May 1997, pp. 932-939.
Kraning et al., "Dynamic Network Energy Management via Proximal Message Passing", Foundations and Trends in Optimization, vol. 1, 2013, 57 pgs.
Lam et al., "Optimal Distributed Voltage Regulation in Power Distribution Networks", arXiv.org, Retrieved from: https://arxiv.org/abs/1204.5226v1, Apr. 23, 2012, 24 pgs.
Lam et al., "Distributed Algorithms for Optimal Power Flow Problem", arXiv.org, Retrieved from: https://arxiv.org/abs/1109.5229, Sep. 24, 2011, 12 pgs.
Lavaei et al., "Zero Duality Gap in Optimal Power Flow Problem", IEEE Transactions on Power Systems, 2012, vol. 27, No. 1, pp. 1-16.
Lee et al., "ACN-Data: Analysis and Applications of an Open EV Charging Dataset", Proceedings of the Tenth International Conference on Future Energy Systems, e-Energy '19, Jun. 25-28, 2019, 12 pgs.
Lee et al., "Adaptive Charging Network for Electric Vehicles", Proceedings of the IEEE Global Conference on Signal and Information Processing (GlobalSIP), Dec. 7-9, 2016, pp. 891-895.
Lee et al., "Large-Scale Adaptive Electric Vehicle Charging", IEEE International Conference on Communications, Control, and Computing Technologies for Smart Grids, Oct. 2018, 7 pgs., DOI: 10.1109/SmartGridComm.2018.8587550.
Lee et al., "ACN-Sim: An Open-Source Simulator for Data-Driven Electric Vehicle Charging Research", Proceeds of the IEEE International Conference on Communications, Control, and Computing Technologies for Smart Grids (SmartGridComm), Oct. 2019, 6 pgs.
Lee et al., "Shared Solar-Powered EV Charging Stations: Feasibility and Benefits", 2016 IEEE Seventh International Green and Sustainable Computing Conference (IGSC), Nov. 7-9, 2016, 8 pgs., https://doi.org/10.1109/IGCC.2016.7892600.
Li et al., "Demand Response in Radial Distribution Networks: Distributed Algorithm", 2012 Conference Record of the Forty Sixth Asilomar Conference on Signals, Systems and Computers (ASILOMAR), Nov. 4-7, 2012, 5 pgs.
Li et al., "Connecting Automatic Generation Control and Economic Dispatch from an Optimization View", 2014 American Control Conference (ACC), Jun. 4-6, 2014, pp. 735-740.
Li et al., "Optimal Demand Response Based on Utility Maximization in Power Networks", 2011 IEEE Power and Energy Society General Meeting, Jul. 24-29, 2011, 8 pgs.
Baran et al., "Network reconfiguration in distribution systems for loss reduction and load balancing", IEEE Transactions on Power Delivery, Apr. 1989, vol. 4, No. 2, pp. 1401-1407.
Baran et al., "Optimal capacitor placement on radial distribution systems", IEEE Transactions on Power Delivery, vol. 4, No. 1, Jan. 1989, pp. 725-734.
Baran et al., "Optimal sizing of capacitors placed on a radial distribution system", IEEE Transactions on Power Delivery, vol. 4, No. 1, Jan. 1989, pp. 735-743.
Berg et al., "Mechanized Calculation of Unbalanced Load Flow on Radial Distribution Circuits", IEEE Transactions on Power Apparatus and Systems, vol. PAS-86, No. 4, Apr. 1967, pp. 415-421.
Bergen et al., "A structure preserving model for power system stability analysis", IEEE Transactions on Power Apparatus and Systems, vol. PAS-100, No. 1, Jan. 1981, pp. 25-35.
Bernardo, "Fast Charging Stations: Network Planning versus Free Entry", Apr. 22, 2013, 14 pgs.
Bitar et al., "Deadline Differentiated Pricing of Deferrable Electric Power Service", 2012 IEEE 51st IEEE Conference on Decision and Control (CDC), Dec. 10-13, 2012, Maui, HI, USA, pp. 4991-4997.
Bitar et al., "Deadline Differentiated Pricing of Delay-Tolerant Demand", arXiv.org, Retrieved from: https://arxiv.org/abs/1407.1601v2, Jan. 20, 2015, 28 pgs.
Blair et al., "System Advisor Model (SAM) General description (Version 2017.9.5)", Technical Report, NREL/TP-6A20-70414, May 2018, 24 pgs.
Bohn et al., "A Real World Technology Testbed For Electric Vehicle Smart Charging Systems and PEV-EVSE Interoperability Evaluation", Proceedings of the IEEE Energy Conversion Congress and Exposition (ECCE), Milwaukee, Wisconsin, Sep. 18-22, 2016, 8 pgs.
Bohn et al., "Local Automatic Load Control for Electric Vehicle Smart Charging Systems Extensible Via OCPP Using Compact Submeters", Proceedings of the IEEE Transportation Electrification Conference and Expo (ITEC), Chicago, Illinois, Jun. 22-24, 2017, pp. 724-731.
Boyd et al., "Convex Optimization", Cambridge University Press, 2004, 730 pgs.
Boyd et al., "Distributed Optimization and Statistical Learning via the Alternating Direction Method of Multipliers", Foundations and Trends in Machine Learning, vol. 3, No. 1, 2010, 125 pgs.
Brooks et al., "Demand Dispatch; Using Real-Time Control of Demand to Help Balance Generation and Load", IEEE Power and Energy Magazine, vol. 8, No. 3, May-Jun. 2010, pp. 20-29.
Burger et al., "An internal model approach to (optimal) frequency regulation in power grids", arXiv.org, Retrieved from: https://arxiv.org/abs/1403.7019v1, Mar. 27, 2014, 14 pgs.
Cain et al.; "History of optimal power flow and formulations; Optimal Power Flow Paper 1", Federal Energy Regulatory Commission, Dec. 2012, 36 pgs.
Callaway et al., "Achieving Controllability of Electric Loads", Proceedings of the IEEE, vol. 99, No. 1, Jan. 2011, pp. 184-199.
Capitanescu et al., "Interior-point based algorithms for the solution of optimal power flow problems", Electric Power Systems Research, vol. 77, No. 5-6, Apr. 2007, pp. 508-517, https://doi.org/10.1016/j.epsr.2006.05.003.
Caiso, "Today's Outlook", Jan. 2019, 1 pg., http:/www.caiso.com/TodaysOutlook/Pp./Default.aspx.
Caiso, "What the duck curve tells US about managing a green grid", California Independent System Operator, 2016, 4 pgs.
Castillo et al., "Survey of Approaches to Solving the ACOPF; Optimal Power Flow Paper 4", Federal Energy Regulatory Commission, Mar. 2013, 49 pgs.
Chang et al., "Financial Viability of Non-Residential Electric Vehicle Charging Stations", Technical Report, Luskin Center for Innovation, Anderson School of Management, UCLA, Aug. 2012, 51 pgs.
Chen et al, "Electric Vehicle Charging in Smart Grid: Optimality and Valley-filling Algorithms", IEEE Journal of Selected Topics in Signal Processing, vol. 8, No. 6, Dec. 2014, pp. 1-11.
Chen et al., "An Analysis of the Charging Characteristics of Electric Vehicles Based on Measured Data and Its Application", IEEE Access, vol. 6, 2018, pp. 24475-24487.
Chen et al., "Distribution system power flow analysis—A Rigid Approach", IEEE Transactions on Power Delivery, vol. 6, No. 3, Jul. 1991, pp. 1146-1152.

(56) References Cited

OTHER PUBLICATIONS

Chen et al., "iEMS for Large Scale Charging of Electric Vehicles: Architecture and Optimal Online Scheduling", 2012 IEEE Third International Conference on Smart Grid Communications (SmartGridComm), Nov. 5-8, 2012, 6 pgs.
Chen et al., "Optimizing Operations for Large Scale Charging of Electric Vehicles", 2013 46th Hawaii International Conference on System Sciences, Jan. 7-10, 2013, pp. 2319-2326.
Cheng et al., "A Three-Phase Power Flow Method for Real-Time Distribution System Analysis", IEEE Transactions on Power Systems, vol. 10, No. 2, May 1995, 671-679.
Cherukuri et al., "Asymptotic convergence of constrained primal-dual dynamics", Systems & Control Letters, vol. 87, Jan. 31, 2016, pp. 10-15.
Cheung et al., "Power System Toolbox Version 3.0", Rensselaer Polytechnic Institute and Cherry Tree Scientific Software, 2009, 123 pgs.
Choi et al., "General Service Time-of-Use, Electric Vehicle Charging, Demand Metered", Aug. 2017, 9 pgs.
Chow et al., "A Toolbox for Power System Dynamics and Control Engineering Education and Research", IEEE Transactions on Power Systems, vol. 7, No. 4, Nov. 1992, pp. 1559-1564.
Chung et al., "Electric Vehicle User Behavior Prediction Using Hybrid Kernel Density Estimator", 2018 IEEE International Conference on Probabilistic Methods Applied to Power Systems (PMAPS), Jun. 2018, 6 pgs.
Chung et al., "Master-Slave Control Scheme in Electric Vehicle Smart Charging Infrastructure", The Scientific World Journal, vol. 2014, No. 462312, May 26, 2014, 14 pgs.
Chynoweth et al., "Smart Electric Vehicle Charging Infrastructure Overview", Proceedings of the 5th IEEE PES Innovative Smart Grid Technologies (ISGT), Washington D.C., Feb. 19-22, 2014, 5 pgs.
Clement-Nyns et al., "The Impact of Charging Plug-In Hybrid Electric Vehicles on a Residential Distribution Grid", IEEE Transactions on Power Systems, vol. 25, No. 1, Feb. 2010, pp. 371-380.
Coignard et al., "Clean Vehicles as an enabler for a clean electric grid", Environmental Research Letters, vol. 13, No. 054031, May 16, 2018, pp. 1-8, https://doi.org.10.1088/1748-9326/aabe97.
Contaxis et al., "Decoupled Optimal Load Flow Using Linear or Quadratic Programming", IEEE Transactions on Power Systems, vol. PWRS-1, No. 2, May 1986, pp. 1-7.
Cross et al., "My Electric Avenue: Integrating electric vehicles into the electrical networks", 6th Hybrid and Electric Vehicles Conference (HEVC 2016), Nov. 2016, pp. 1-6, https://doi.org/10.1049/cp.2016.0972.
Dall'Anese et al., "Distributed Optimal Power Flow for Smart Microgrids", IEEE Transactions on Smart Grid, vol. 4, No. 3, Sep. 2013, pp. 1464-1475.
De Hoog et al., "Optimal Charging of Electric Vehicles Taking Distribution Network Constraints into Account", IEEE Transactions on Power Systems, Jan. 2015, vol. 30, No. 1, pp. 1-11, https://doi.org/10.1109/TPWRS.2014.2318293.
Denholm et al., "Co-benefits of large scale plug-in hybrid electric vehicle and solar PV deployment", Journal of Power Sources, vol. 236, Aug. 2013, pp. 350-356, https://doi.org/10.1016/j.jpowsour.2012.10.007.
Devane et al., "Stability and convergence of distributed algorithms for the OPF problem", 52nd IEEE Conference on Decision and Control, Dec. 10-13, 2013, 6 pgs.
Develder et al., "Quantifying flexibility in EV charging as DR potential Analysis of two real-word data sets", 2016 IEEE International Conference on Smart Grid Communications (SmartGridComm), 6 pgs., https://doi.org.10/1109/SmartGridComm.2016.7778827.
Dommel et al., "Optimal Power Flow Solutions", IEEE Transactions on Power Apparatus and Systems, vol. PAS-87, No. 10, Oct. 1968, pp. 1866-1876.
Donnelly et al., "Frequency and Stability Control using Decentralized Intelligent Loads: Benefits and Pitfalls", IEEE PES General Meeting, Jul. 25-29, 2010, 6 pgs.
Dorfler et al., "Breaking the Hierarchy: Distributed Control and Economic Optimality in Microgrids", IEEE Transactions on Control of Network Systems, vol. 3, No. 3, Sep. 2016, 10 pgs.
Dorfler et al., "Plug-and-Play Control and Optimization in Microgrids", 53rd IEEE Conference on Decision and Control, Dec. 15-17, 2014, 8 pgs.
Dupuis, "Dynamical systems and variational inequalities", Annals of Operations Research, vol. 44, No. 1, 1993, pp. 9-42.
Tang et al., "A Model Predictive Control Approach for Low-Complexity Electric Vehicle Charging Scheduling: Optimality and Scalability", arXiv.org, Retrieved from: https://arxiv.org/abs/1502.01456, Apr. 1, 2016, 13 pgs.
Tao, "Optimal Power Flow Via Quadratic Modeling", PhD Dissertation, Georgia Institute of Technology, Dec. 2011, 194 pgs.
Taylor et al., "Convex models of distribution system reconfiguration", Transactions on Power Systems, vol. 6, No. 1, Jan. 2007, pp. 1-5.
Topcu et al., "Compositional stability analysis based on dual decomposition", Proceedings of the 48h IEEE Conference on Decision and Control (CDC) held jointly with 2009 28th Chinese Control Conference, Dec. 15-18, 2009, 6 pgs.
Torres et al., "An interior-point method for nonlinear optimal power flow using voltage rectangular coordinates", IEEE Transactions on Power Systems, vol. 13, No. 4, Nov. 1998, pp. 1211-1218.
Trudnowski et al., "Power-System Frequency and Stability Control using Decentralized Intelligent Loads", 2005/2006 IEEE/PES Transmission and Distribution Conference and Exhibition, May 21-24, 2006, pp. 1-7.
Tsolas et al., "A Structure Preserving Energy Function for Power System Transient Stability Analysis", IEEE Transactions on Circuits and Systems, vol. CAS-32, No. 10, Oct. 1985, pp. 1041-1049.
Turitsyn et al., "Local Control of Reactive Power by Distributed Photovoltaic Generators", 2010 $1^{st}$ IEEE International Conference on Smart Grid Communications, Oct. 4-6, 2010, pp. 79-84.
Wang et al., "EV Charging Algorithm Implementation with User Price Preference", 2015 IEEE Power & Energy Society Innovative Smart Grid Technologies Conference (ISGT), Feb. 18-20, 2015, 5 pgs.
Wang et al., "Event-based Electric Vehicle Scheduling Considering Random User Behaviors", 2015 IEEE International Conference on Smart Grid Communications (SmartGridComm), Nov. 2-5, 2015, 6 pgs.
Wang et al., "Predictive Scheduling Framework for Electric Vehicles with Uncertainties of User Behaviors", IEEE Internet of Things Journal, vol. 4, No. 1, Feb. 2017, pp. 52-63.
Wang et al., "Robust Decentralized Control for Multimachine Power Systems", IEEE Transactions on Circuits and Systems—1: Fundamental Theory and Applications, vol. 45, No. 3, Mar. 1998, pp. 271-279.
Wang et al., "Smart Charging for Electric Vehicles: A Survey from the Algorithmic Perspective", arXiv.org, Retrieved form: https://arxiv.org/abs/1607.07298, Jul. 22, 2016, pp. 1-18.
Wu et al., "Two-Stage Energy Management for Office Buildings with Workplace EV Charging and Renewable Energy", IEEE Transactions on Transportation Electrification, Mar. 2017, vol. 3, No. 1, pp. 225-237, DOI: 10.1109/TTE.2017.2659626.
Xiao et al., "Power Flow Control Approach to Power Systems with Embedded FACTS Devices", IEEE Transactions on Power Systems, vol. 17, No. 4, Nov. 2002, pp. 943-950.
You et al., "Reverse and Forward Engineering of Frequency Control in Power Networks", IEEE Transactions on Automatic Control, vol. 62, No. 9, Sep. 2017, 9 pgs.
Yu et al., "An Intelligent Energy Management System for Large-Scale Charging of Electric Vehicles", CSEE Journal of Power and Energy Systems, vol. 2, No. 1, Mar. 24, 2016, pp. 47-53.
Yu et al., "Demand Response via Large Scale Charging of Electric Vehicles", 2016 IEEE Power and Energy Society General Meeting (PESGM), Jul. 17-21, 2016, 5 pgs.
Yu et al., "On Market Dynamics of Electric Vehicle Diffusion", 2014 52nd Annual Allerton Conference on Communication, Control, and Computing, Sep. 30-Oct. 3, 2014, pp. 1-7.

(56) References Cited

OTHER PUBLICATIONS

Zhang et al., "A Real-Time Control Framework for Smart Power Networks with Star Topology", 2013 American Control Conference (ACC), Jun. 17-19, 2013, pp. 5062-5067.
Zhang et al., "An Improved Least-Laxity-First Scheduling Algorithm of Variable Time Slice for Periodic Tasks", 6th IEEE International Conference on Cognitive Informatics, Aug. 6-8, 2007, pp. 548-553, DOI: 10.1109/COGINF.2007.4341935.
Zhang et al., "Distributed Dynamic Feedback Control for Smart Power Networks with Tree Topology", 2014 American Control Conference (ACC), Jun. 4-6, 2014, pp. 1156-1161.
Zhang et al., "Geometry of Feasible Injection Region of Power Networks", 49th Annual Allerton Conference, Sep. 28-30, 2011, pp. 1508-1515.
Zhao et al., "Design and Stability of Load-Side Primary Frequency Control in Power Systems", IEEE Transactions on Automatic Control, vol. 59, No. 5, May 2014, pp. 1177-1189.
Zhao et al., "Power System Dynamics as Primal-Dual Algorithm for Optimal Load Control", arXiv:1305.0585, Retrieved from: https://arxiv.org/abs/1305.0585, May 2, 2013, pp. 1-35.
Zhao et al., "Swing Dynamics as Primal-Dual Algorithm for Optimal Load Control", 2012 IEEE Third International Conference on Smart Grid Communications (SmartGridComm), Nov. 5-8, 2012, pp. 570-575.
Hybridcars.com. Dec. 2014 Dashboard, Retrieved from: http://www.hybridcars.com, 2014, 10 pgs.
International Preliminary Report on Patentability for International Application PCT/US2018/063637, Report dated Jun. 2, 2020, dated Jun. 11, 2020, 7 Pgs.
International Preliminary Report on Patentability for International Application PCT/US2015/032482, Report dated Nov. 29, 2016, dated Dec. 8, 2016, 12 Pgs.
International Preliminary Report on Patentability for International Application PCT/US2015/033055, Report dated Nov. 29, 2016, dated Dec. 8, 2016, 8 Pgs.
International Preliminary Report on Patentability for International Application PCT/US2015/040031, Report dated Jan. 10, 2017, dated Jan. 10, 2017, 7 Pgs.
International Preliminary Report on Patentability for International Application PCT/US2015/043676, Report dated Feb. 7, 2017, dated Feb. 16, 2017, 6 Pgs.
International Preliminary Report on Patentability for International Application PCT/US2016/028659, Report dated Oct. 24, 2017, dated Nov. 2, 2017, 10 Pgs.
International Preliminary Report on Patentability for International Application PCT/US2016/057398, Report dated Apr. 17, 2018, dated Apr. 26, 2018, 6 Pgs.
International Preliminary Report on Patentability for International Application PCT/US2017/019787, Report dated Aug. 28, 2018, dated Sep. 7, 2018, 11 Pgs.
International Search Report and Written Opinion for International Application PCT/US2015/033055, Report Completed Sep. 9, 2015, dated Sep. 9, 2015, 11 Pgs.
International Search Report and Written Opinion for International Application PCT/US2015/040031, Report Completed Sep. 24, 2015, dated Sep. 24, 2015, 9 Pgs.
International Search Report and Written Opinion for International Application No. PCT/US2015/043676, Search completed Oct. 27, 2015, dated Oct. 27, 2015, 8 Pgs.
International Search Report and Written Opinion for International Application No. PCT/US2016/028659, Search completed Jul. 27, 2016, dated Jul. 28, 2016, 12 Pgs.
International Search Report and Written Opinion for International Application No. PCT/US2016/057398, Search completed Jan. 23, 2017 dated Jan. 23, 2017, 10 Pgs.
International Search Report and Written Opinion for International Application No. PCT/US2017/019787, Search completed May 24, 2017, dated May 24, 2017, 15 Pgs.
International Search Report and Written Opinion for International Application No. PCT/US2018/063637, Search completed Apr. 1, 2019, dated Apr. 1, 2019, 9 Pgs.
International Search Report and Written Opinion for International Application No. PCT/US2020/017531, Search completed Mar. 30, 2020, dated May 4, 2020, 15 pgs.
International Search Report and Written Opinion for International Application PCT/US2015/032482, Report Completed Sep. 9, 2015, dated Sep. 9, 2015, 15 pgs.
"Dynamic Demand Controller", Market Transformation Programme, Intertek Research & Performance Testing, 2008, 21 pgs.
"Electric Vehicle Public Charging—Time vs. Energy", U.S. Department of Energy, The EV Project, Mar. 2013, 4 pgs.
"Gurobi Optimizer Reference Manual", Gurobi Optimization, Version 6.5, 2016, 592 pgs.
"High level analysis of the Plugged-in Places chargepoint usage data", UK Office for Low Emission Vehicles, Sep. 2013, retrieved from https://www.gov.uk/government/publications/high-level-analysis-of-the-plugged-in-places-chargepoint-usage-data, 34 pgs.
"Distribution Test Feeders", IEEE Power & Energy Society, modified Aug. 5, 2013, online at available at http://ewh.ieee.org/soc/pes/dsacom/testfeeders/, retrieved on Jul. 10, 2017, 3 pgs.
"SAE Electric Vehicle and Plug in Hybrid Electric Vehicle Conductive Charge Coupler J1772_201710", SAE International, Oct. 1, 1996, Revised: Oct. 13, 2017, 59 pgs.
Alsac et al., "Further developments in LP-based optimal power flow", IEEE Transactions on Power Systems, vol. 5, No. 3, Aug. 1990, pp. 697-711.
Andreasson et al., "Distributed Control of Networked Dynamical Systems Static Feedback, Integral Action and Consensus", IEEE Transactions on Automatic Control, vol. 59, No. 7, Jul. 2014, pp. 1750-1764.
Andreasson et al., "Distributed vs. Centralized Power Systems Frequency Control", 2013 European Control Conference (ECC), Jul. 17-19, 2013, pp. 3524-3529.
Araposthatis et al., "Analysis of power-flow equation", International Journal of Electrical Power & Energy Systems, vol. 3, No. 3, Jul. 1981, pp. 115-126.
Ardakanian et al., "Quantifying the Benefits of Extending Electric Vehicle Charging Deadlines with Solar Generation", IEEE International Conference on Smart Grid Communications, 2014, pp. 620-625; https://doi.org/10.1109/SmartGridComm.2014.7007716.
Bacciotti et al., "Nonpathological Lyapunov functions and discontinuous Caratheodory systems", Prepint submitted to: Automatica, vol. 42, No. 3, Mar. 31, 2006, pp. 453-458, Oct. 27, 2004, 6 pgs.
Bai et al., "Semidefinite programming for optimal power flow problems", Electrical Power and Energy Systems, vol. 30, 2008, pp. 383-392.
Baldick et al., "A Fast Distributed Implementation of Optimal Power Flow", IEEE Transactions on Power Systems, vol. 14, No. 3, Aug. 1999, pp. 858-864.
Baptista et al., "Logarithmic barrier-augmented Lagrangian function to the optimal power flow problem", Electrical Power & Energy Systems, vol. 27, No. 7, 2005, pp. 528-532.
Extended Search Report for European Application No. 18884678.6, Search completed Jul. 12, 2021, dated Jul. 26, 2021, 10 Pgs.
International Preliminary Report on Patentability for International Application PCT/US2020/017531, Report dated Aug. 10, 2021, dated Aug. 19, 2021, 9 Pgs.

\* cited by examiner

Table 1: Selected data fields in ACN-Data.

| Field | Description |
|---|---|
| connectionTime | Time when the user plugs in. |
| doneChargingTime | Time of the last non-zero charging rate. |
| disconnectTime | Time when the user unplugs. |
| kWhDelivered | Measured Energy Delivered |
| siteID | Identifier of the site where the session took place. |
| stationID | Unique identifier of the EVSE. |
| sessionID | Unique identifier for the session. |
| timezone | Timezone for the site. |
| pilotSignal | Time series of pilot signals during the session. |
| chargingCurrent | Time series of actual charging current of the EV. |
| userID* | Unique identifier of the user. |
| requestedDeparture* | Estimated time of departure. |
| kWhRequested* | Estimated energy demand. |

*Field not available for every session.

FIG. 8

Table 2: SMAPEs for Caltech and JPL datasets.

| Caltech | I-GMM | P-GMM | Mean | User Input |
|---|---|---|---|---|
| SMAPE($d$)% | 15.8543 | 16.6313 | 20.4432 | 25.8093 |
| SMAPE($e$)% | 14.4273 | 17.2927 | 15.9275 | 27.5523 |

| JPL | I-GMM | P-GMM | Mean | User Input |
|---|---|---|---|---|
| SMAPE($d$)% | 12.2500 | 12.5079 | 15.8985 | 18.5994 |
| SMAPE($e$)% | 12.7318 | 13.6863 | 13.3014 | 26.8769 |

FIG. 17

SYSTEMS AND METHODS FOR ADAPTIVE EV CHARGING

CROSS-REFERENCE TO RELATED APPLICATIONS

The present invention claims priority to U.S. Provisional Patent Application Ser. No. 62/803,157 entitled "Date-Driven Approach To Joint EV And Solar Optimization Using Predictions" to Zachary J. Lee et. al., filed Feb. 8, 2019, and to U.S. Provisional Patent Application Ser. No. 62/964,504 entitled "EV Charging Optimization Using Adaptive Charging Network Data" to Zachary J. Lee et. al., filed Jan. 22, 2020, the disclosures of which are herein incorporated by reference in their entirety.

STATEMENT OF FEDERALLY SPONSORED RESEARCH

This invention was made with government support under Grant No. CCF1637598 awarded by the National Science Foundation. The government has certain rights in the invention.

FIELD OF THE INVENTION

The present invention generally relates to electric vehicles and more specifically relates to systems and methods for adaptive electric vehicle charging.

BACKGROUND

An incredible amount of infrastructure is relied upon to transport electricity from power stations, where the majority of electricity is currently generated, to where it is consumed by individuals. Power stations can generate electricity in a number of ways including using fossil fuels or using renewable energy sources such as solar, wind, and hydroelectric sources. Substations typically do not generate electricity, but can change the voltage level of the electricity as well as provide protection to other grid infrastructure during faults and outages. From here, the electricity travels over distribution lines to bring electricity to locations where it is consumed such as homes, businesses, and schools. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional places along the electric grid.

Electric vehicles (EVs), which include plug-in hybrid electric vehicles (PHEVs), can use an electric motor for propulsion. EV adoption has been spurred by federal, state, and local government policies providing various incentives (e.g. rebates, fast lanes, parking, etc.). Continued EV adoption is likely to have a significant, impact on the future smart grid due to the additional stress load that EVs add to the grid (an EV's power demand can be many times that of an average residential house).

Duck curve, named after its resemblance to a duck, shows a difference in electricity demand and amount of available solar energy throughout the day. When the sun is shining, solar floods the market and then drops off as electricity demand peaks in the evening.

SUMMARY OF THE INVENTION

Systems and methods in accordance with embodiments of the invention impalement adaptive electric vehicle (EV) charging. One embodiment includes one or more electric vehicle supply equipment (EVSE); an adaptive EV charging platform, including a processor; a memory containing: an adaptive EV charging application: a plurality of EV charging parameters. In addition, the processor is configured by the adaptive EV charging application to: collect the plurality of EV charging parameters from one or more EVSEs, simulate EV charging control routines and push out updated EV charging control routines to the one or more EVSEs. Additionally, the adaptive EV charging platform is configured to control charging of EVs based upon the plurality of EV charging parameters collected from at least one EVSE.

In a further embodiment, the processor is configured to learn an underlying distribution of EV arrival time, session duration, and energy delivered.

In still a further embodiment, the processor is configured to learn an underlying distribution of EV arrival time, session duration, and energy delivered using Gaussian mixture models (GMMs).

In a yet further embodiment, the GMMs are used to predict EV users' charging behavior.

In a yet further embodiment again, the processor is further configured to use the GMMs to control charging of large numbers of EVs in order to smooth a difference in electricity demand and amount of available solar energy throughout the day (Duck curve).

In another embodiment again, the processor is further configured to train the GMMs based on a training dataset and predict a charging duration and energy delivered.

In a yet further embodiment, the GMMs are population-level GMMs (P-GMM).

In another embodiment again, the GMMs are individual-level GMMs (I-GMM).

In another embodiment still, the adaptive EV charging system further includes a power distribution network.

In still a further embodiment, the plurality of EV charging parameters include EV driver laxity data.

In another embodiment still, the processor is further configured by the adaptive EV charging application to: receive an EV request for charging, determine an amount of energy and a duration for delivering the amount of energy to the EV, optimize time-varying charging rate based on time of day and electric system load, and synchronize with one or more EVSEs to deliver optimum charge to the EV.

In a further additional embodiment, an adaptive electric vehicle charging platform includes: a processor; a memory containing: an adaptive EV charging application; a plurality of EV charging parameters; wherein the processor is configured by the adaptive EV charging application to: collect the plurality of EV charging parameters from one or more EVSEs, simulate EV charging control routines and push out updated EV charging control routines to the one or more EVSEs; and wherein the processor is configured by the adaptive EV charging application to: receive an EV request for charging, determine an amount of energy and a duration for delivering the amount of energy to the EV, optimize time-varying charging rate based on time of day and electric system load, and synchronize with an electric vehicle charging station to deliver optimum charge to the EV.

In still yet an other embodiment again, the processor is further configured to learn an underlying model of an electric vehicle's battery charging behavior.

In a further additional embodiment, the processor is further configured to learn battery models based on a training dataset, and to predict a maximum charging rate and threshold state of charge for a linear 2-stage battery model.

In still a further additional embodiment, the processor is further configured to use learned battery models to simulate EV charging control routines.

In still yet another embodiment again, the processor is further configured to use learned battery models to predict energy delivered.

BRIEF DESCRIPTION OF THE DRAWINGS

FIG. 8 shows a table which describes some of relevant data collected in accordance with an embodiment, of the invention.

FIG. 17 shows a table which displays the average SMAPEs for various methods tested in accordance with an embodiment, of the invention.

DETAILED DESCRIPTION

Turning now to the drawings, systems and methods for adaptive EV charging in accordance with embodiments of the invention are illustrated. In many embodiments, systems and methods for adaptive EV charging can use adaptive charging network (ACN) data collected from EV charging physical infrastructure sites located in various localities in order to simulate EV charging control routines, and then push out updated EV charging control routines to one or more of EV charging physical infrastructure sites. In several embodiments, systems and methods for adaptive EV charging can be utilized to collect data from electric vehicle supply equipment (EVSEs) or charging stations, aggregate the collected data in a cloud based system, analyze the collected data to arrive at new charging processes, and then push out the new charging processes to the EV chargers. In many embodiments, systems and methods for adaptive EV charging can be used to gather EV charging data, to utilize the underlying distribution of charging session parameters in order to train models of EV user behaviors, and control the charging of a vehicle based upon those models in smart and reliable processes that are not relied upon EV user's inputs. In several embodiments, systems and methods for adaptive EV charging can be used for controlling charging of large numbers of electric vehicles in order to alleviate steep ramping conditions caused by the so called Duck curve, and utilize user data to smooth EV energy demand over the course of a day, and therefor smooth out the Duck curve. In many embodiments, systems and methods for adaptive EV charging can include a processor, and a memory containing: an adaptive EV charging application; a plurality of EV charging parameters, where the processor is configured to learn an underlying model of an electric vehicle's battery charging behavior. EV power distribution networks and methods of controlling the charging of EVs in accordance with various embodiments of the invention are discussed further below.

Electric Vehicle Power Distribution Networks

Figure 1:
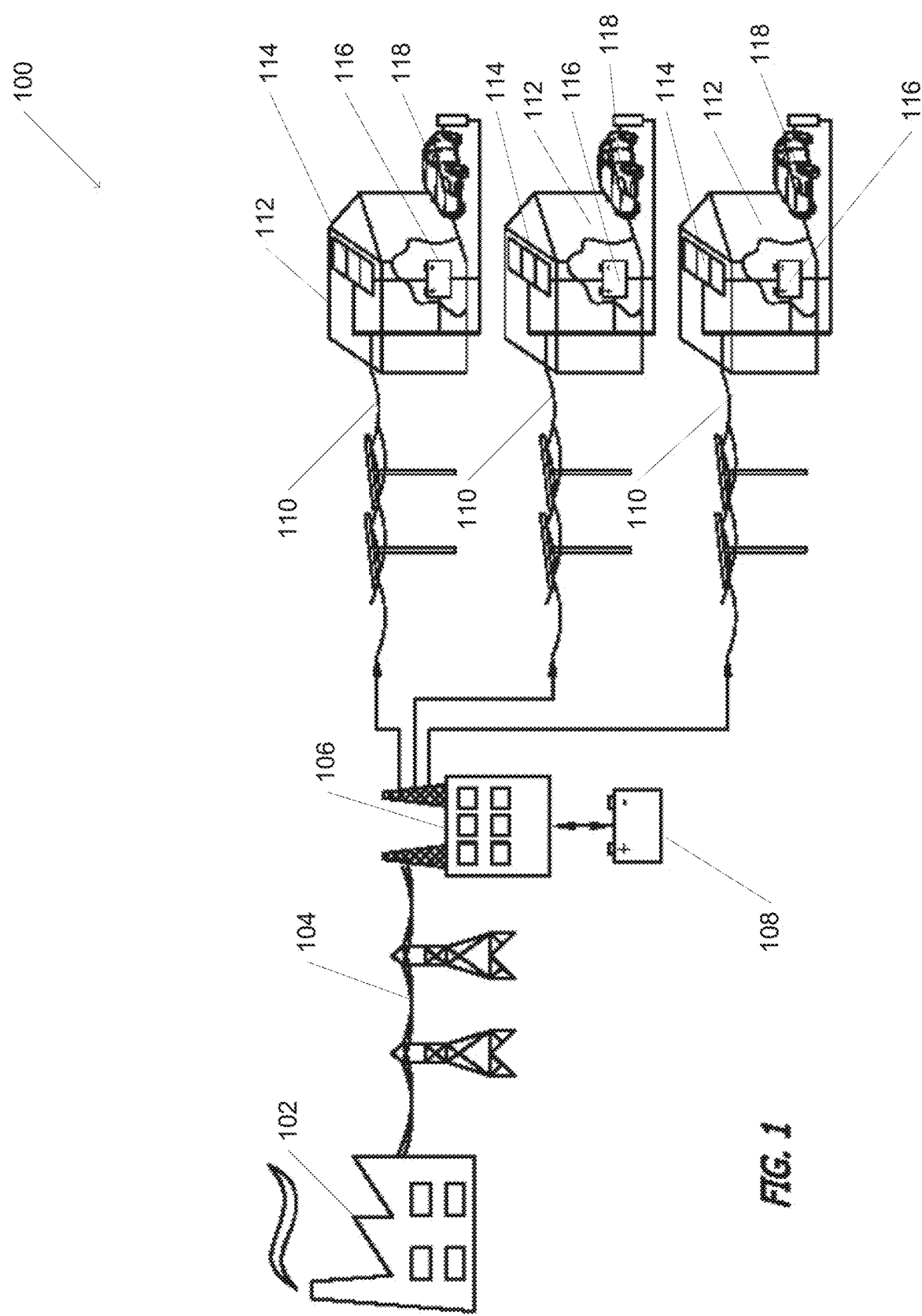
FIG. 1 is a diagram conceptually illustrating a power distribution network in accordance with an embodiment of the invention.

A power distribution network in accordance with an embodiment of the invention is shown in FIG. 1. Electricity is generated at power generator 102. Power transmission lines 104 can transmit electricity between the power generator and power substation 106. Power substation 106 additionally can connect to one or more large storage batteries 108, which temporarily store electricity, as well as power distribution lines 110. The power distribution lines 110 can transmit electricity from the power substation to one or more charging stations 112. Charging station 112 can include a battery 114, and/or solar panels 116. Electric vehicles 118 can connect to the charging station and request charging.

The power generator 102 can represent a power source including (but not limited to) those using fossil fuels, nuclear, solar, wind, or hydroelectric power. Substation 106 changes the voltage of the electricity for more 19 efficient power distribution. Solar panels 116 are distributed power generation sources, and can generate power to supply electric charging stations as well as generate additional power for the power grid.

While specific systems incorporating a power distribution network are described above with reference to FIG. 1, any of a variety of systems including adaptive EV charging can be utilized to provide adaptive EV charging as appropriate to the requirements of specific applications in accordance with various embodiments of the invention. Cloud based adaptive EV charging application in accordance with a number of embodiments of the invention are discussed below.

Cloud Based Adaptive EV Charging Application

Figure 2:
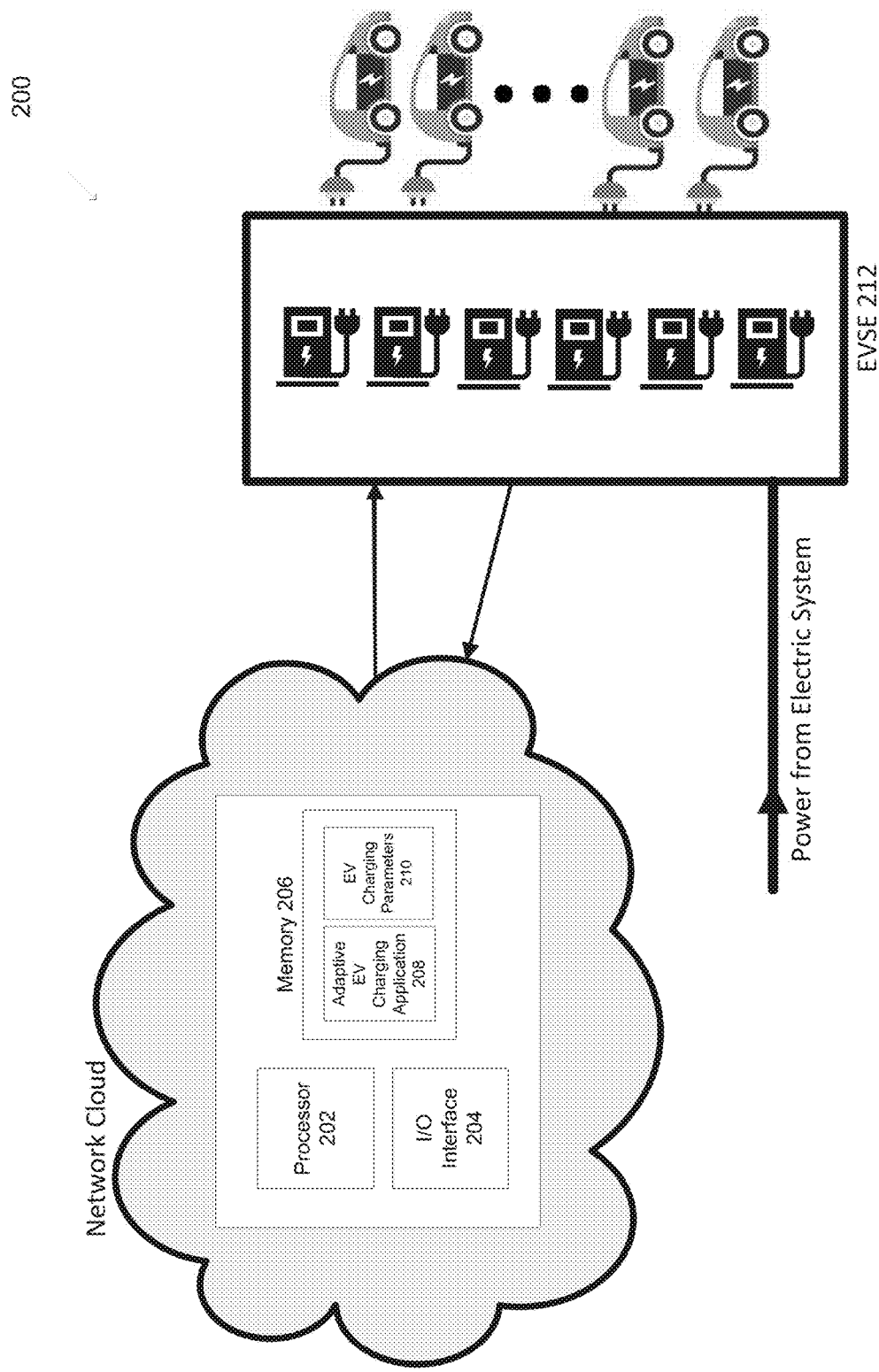
FIG. 2 illustrates adaptive charging network (ACN) data collection from an EV charging site in order to simulate EV charging control routines which are located in a network cloud, and push-out of updated EV charging control routines to the EV charging site in accordance with an embodiment of the invention.

A cloud based adaptive EV charging application in accordance with an embodiment of the invention is shown in FIG. 2. In several embodiments, one or more electric vehicles can connect to electric vehicle supply equipment (EVSE) 212 and request charging. In the illustrated embodiment, systems and methods for adaptive EV charging include at least a processor 202, an I/O interface 204 and memory 206. In many embodiments, the memory can include software including adaptive EV charging application 208 as well as charging parameters 210. In many embodiments, the adaptive EV charging application 208 can collect data from the EVSE regarding EV charging patterns. The adaptive EV charging application 208 can provide a charging control routine to the EVSE in accordance with an embodiment of the invention. The adaptive EV charging application 208 can calculate charging parameters by using a combination of its own EV parameters, and/or adaptive EV charging parameters.

While specific systems incorporating cloud based adaptive EV charging application are described above with reference to FIG. 2, any of a variety of systems can be utilized to provide a cloud based adaptive EV charging application as appropriate to the requirements of specific applications in accordance with various embodiments of the invention. Adaptive EV charging platforms that include ACN data collection, ACN simulation and/or control routine push-out in accordance with a number of embodiments of the invention are discussed further below.

ACN Data Collection, ACN Simulation and Control Routine Push-Out

Figure 3:
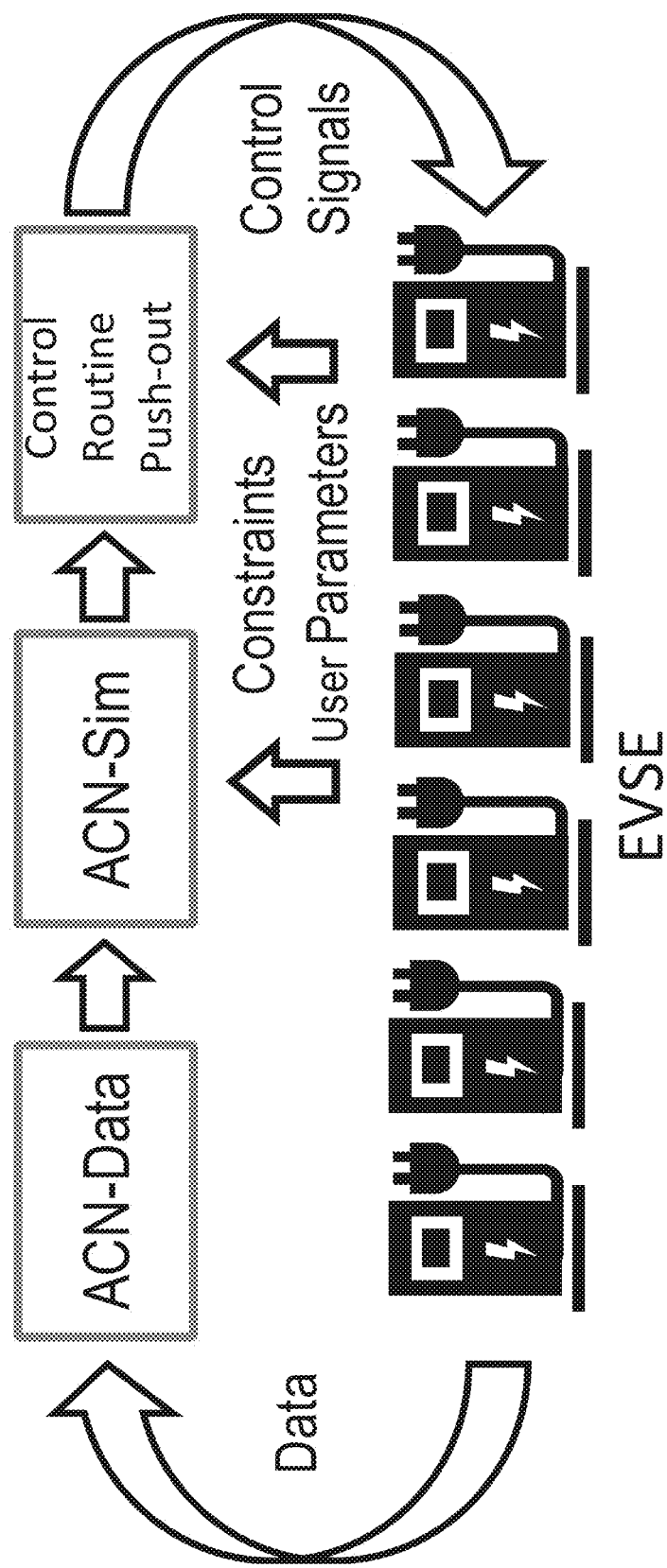
FIG. 3 illustrate ACN data collection, simulating control routines, and pushing out updated control routines in accordance with an embodiment of the invention.
Figure 4:
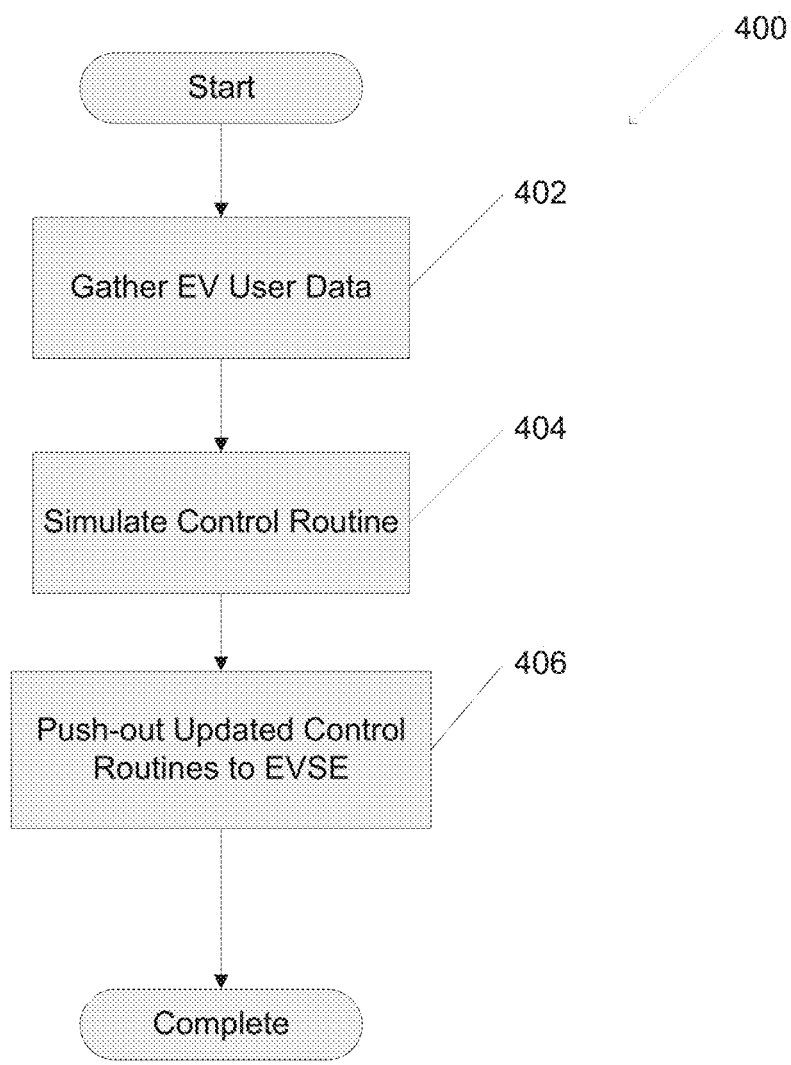
FIG. 4 is a flow chart illustrating a process for gathering EV user data, simulating control routines, and pushing out updated control routines in accordance with an embodiment of the invention.

An adaptive EV charging platform including ACN data collection, ACN simulation and control routine push-out in accordance with an embodiment of the invention is shown in FIG. 3. In several embodiments, the adaptive EV charging platform can collect ACN data from one or more EVSEs, simulate control routines, and then push out updated control processes to one or more ETVSEs. In many embodiments, the adaptive EV charging platform can receive user parameters in order to update the control routines. A flow chart illustrating a process for gathering EV user data, simulating control routines, and pushing out updated EV charging control routines in accordance with an embodiment of the invention is shown in FIG. 4. An overview of the process for adaptive EV charging is illustrated in FIG. 4. EV user data is gathered 402 and fed to 404, where control routines are simulated. Updated control routines are pushed-out to EVSEs 406.

While specific systems incorporating an adaptive EV charging platform including ACN data collection, ACN simulation and control routine push-out are described above with reference to FIGS. 3 and 4, any of a variety of systems can be utilized to provide an adaptive EV charging platform including ACN data collection, ACN simulation and control routine push-out as appropriate to the requirements of specific applications in accordance with various embodiments of the invention. A process for receiving EV user request and delivering optimum charge in accordance with a number of embodiments of the invention are discussed further below.

Process for Receiving EV User Request and Delivering Optimum Charge

Figure 5:
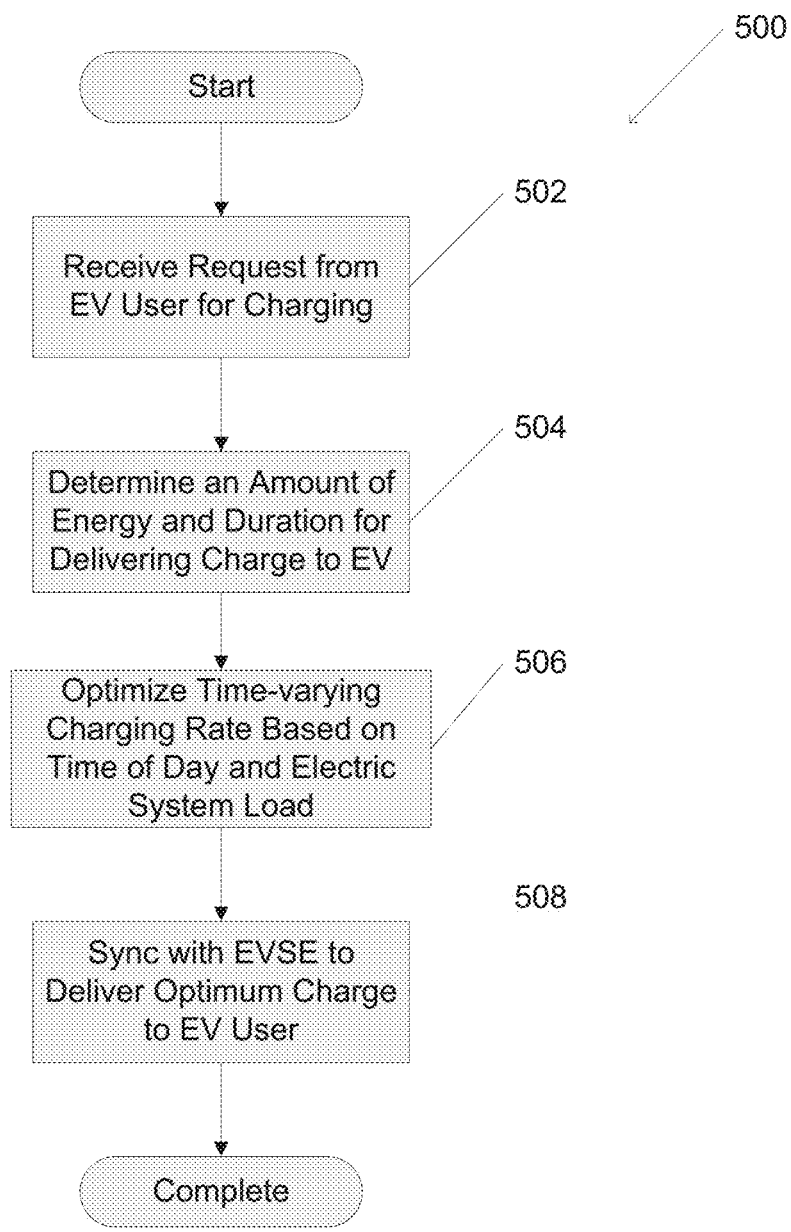
FIG. 5 is a flow chart illustrating a process for receiving an EV user request for charging and delivering optimum charge to the EV user in accordance with an embodiment of the invention.

A flow chart illustrating a process for receiving an EV user request for charging and delivering optimum charge to the EV user in accordance with an embodiment of the invention is shown in FIG. 5. In many embodiments, an adaptive EV charging process can receive a request for charging from an EV user 502. An amount of energy and a duration for delivering that energy to the EV user is determined using the adaptive EV charging process 504. The time-varying charging rate based on time of day and electric system load is determined 506. The adaptive EV charging process then synchronizes with an EVSE to deliver optimum charge to the EV user 508.

While specific systems incorporating a flow chart illustrating a process for receiving an EV user request for charging and delivering optimum charge are described above with reference to FIG. 5, any of a variety of systems can be utilized incorporating a flow chart illustrating a process for receiving an EV user request for charging and delivering optimum charge for the requirements of specific applications in accordance with various embodiments of the invention. Usage of EV driver laxity to oversubscribe EVSEs in accordance with a number of embodiments of the invention are discussed further below.

Use of EV Driver Laxity to Oversubscribe EVSEs

Figure 6B:
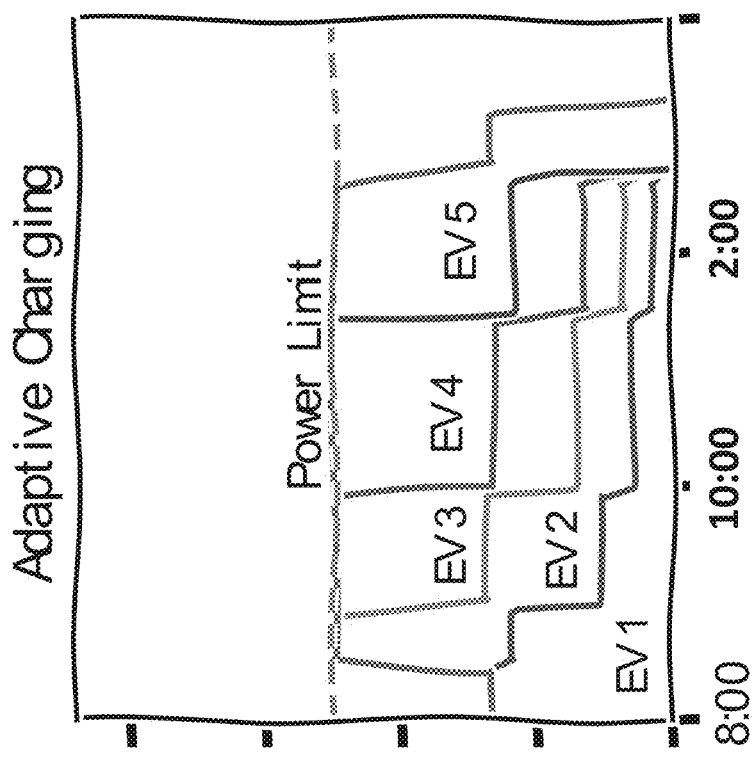
FIGS. 6A and 6B illustrate that EV driver laxity can be used to oversubscribe electric vehicle supply equipment in accordance with an embodiment of the invention.
Figure 6A:
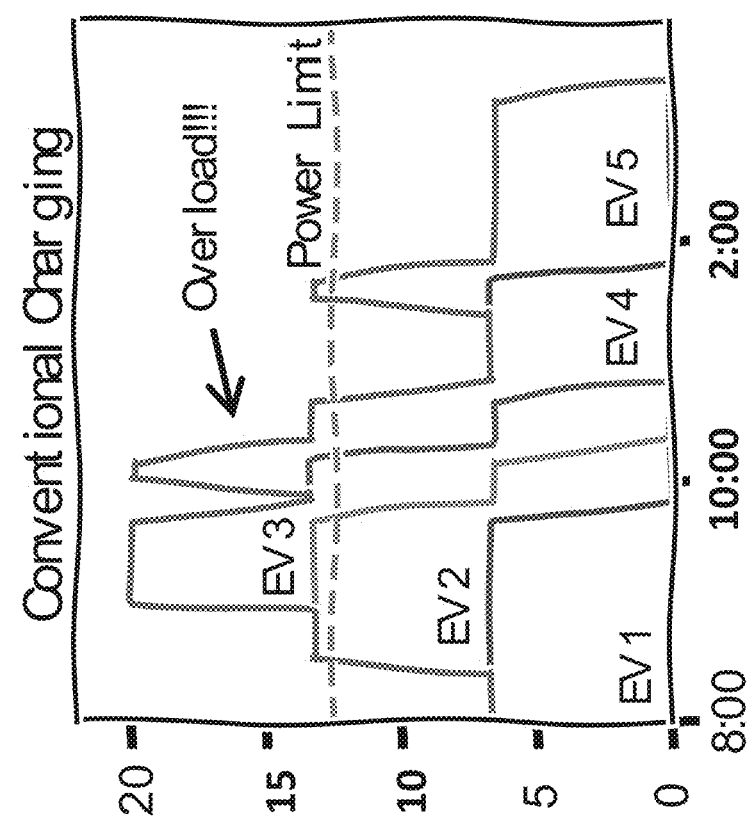

EV driver laxity can be used to oversubscribe charging infrastructure, such as, but not limited to, transformers, cables, and utility interconnections, in accordance with an embodiment of the invention as shown in FIGS. 6A and 6B. In certain embodiments, a conventional charging process can exceed a power limit of an EVSE during peak charging hours as illustrated in FIG. 6A. Adaptive EV charging can control charging of EVs such that a power limit of EVSE is not exceeded in accordance with an embodiment of the invention as illustrated in FIG. 6B.

While specific systems incorporating use of EV driver laxity to oversubscribe EVSEs are described above with reference to FIGS. 6A and 6B, any of a variety of systems can be utilized to provide use of EV driver laxity to oversubscribe EVSEs for the requirements of specific applications in accordance with various embodiments of the invention. Demand met by adaptive charging compared to other charging methods in accordance with a number of embodiments of the invention are discussed further below.

Comparison of Adaptive EV Charging to Other Methods

Figure 7:
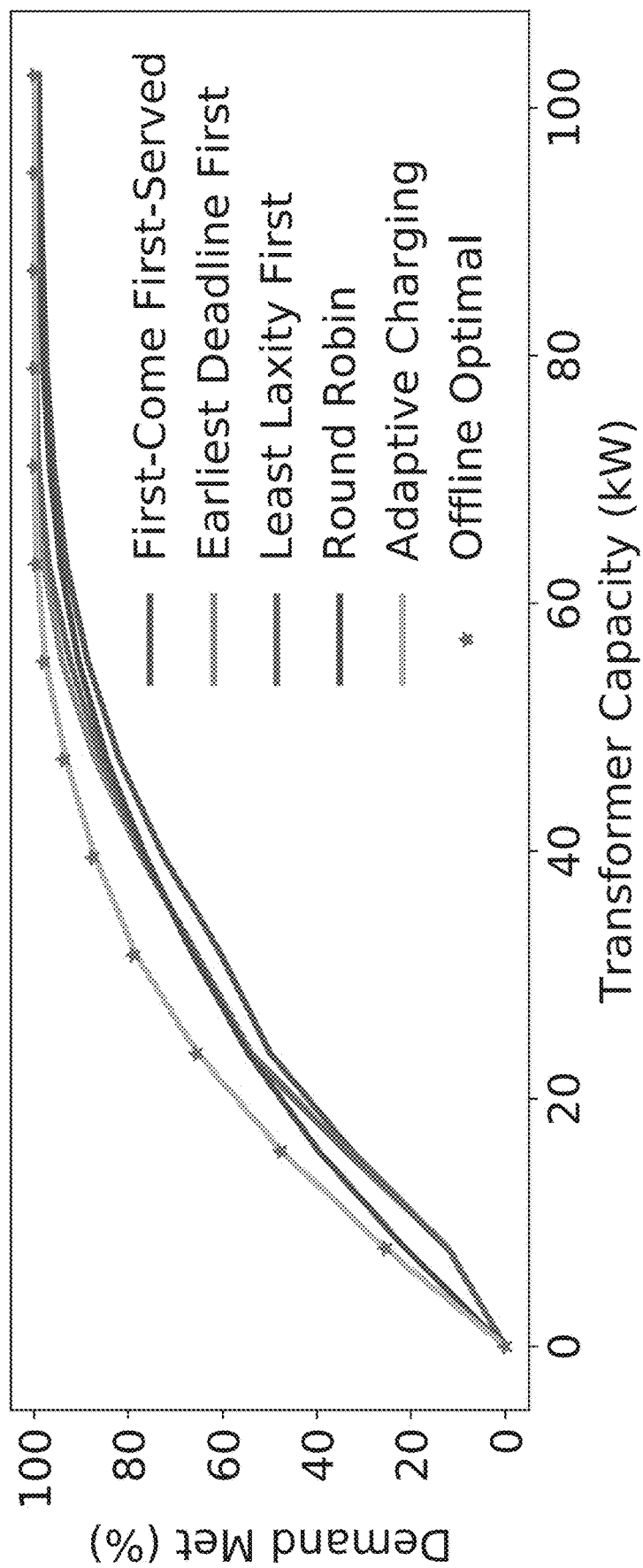
FIG. 7 illustrates an increase in an amount of demand met using adaptive charging compared to other methods of charging in accordance with an embodiment of the invention.

Adaptive charging can increase the amount of demand met compared to other charging methods in accordance with an embodiment of the invention as illustrated in FIG. 7. In accordance with an embodiment of the invention, demand met by adaptive charging exceeds all other methods of charging as a function of transformer capacity.

While specific systems comparing demand met by adaptive charging to other charging Methods are described above with reference to FIG. 7, any of a variety of systems can be utilized to provide a comparison of demand met by adaptive charging to other charging methods for the requirements of specific applications in accordance with various embodiments of the invention. Adaptive charging network data examples in accordance with a number of embodiments of the invention are discussed further below.

Adaptive Charging Network Data Examples

ACN data was collected from two adaptive charging networks located in California in accordance with an embodiment of the invention. The first location was Caltech campus and the second location was the Jet Propulsion Laboratory (JPL). The Caltech site includes a parking garage and has 54 EVSEs along with a 50 kW dc fast charger. The Caltech site is open to the public and is often used by non-Caltech EV drivers. Since the parking garage is near the campus gym, many drivers charge their EVs while working out in the morning or evening. JPL's site includes 52 EVSEs in a parking garage. In contrast to the Caltech site, access to the JPL site is restricted and only employees are able to use the charging system. The JPL site is representative of workplace charging while the Caltech site is a hybrid between workplace and public use charging. EV penetration is also quite high at JPL. This leads to high utilization of the EVSEs as s well as an impromptu program where drivers move their EVs after they have finished charging to free up plugs for other drivers. In both cases, to reduce capital costs, infrastructure elements such as transformers have been oversubscribed. Note that the specific number of EVSEs can vary.

In many embodiments, an adaptive scheduling routine is used to deliver each driver's requested energy prior to her stated departure time without exceeding the infrastructure capacity. An offline version of the adaptive charging routine that assumes full knowledge of all EV arrival times, departure times, and energy demands in advance in accordance with a number of embodiments of the invention is discussed further below.

Offline Adaptive Charging Routine

In certain embodiments, let V be the set of all EVs over all optimization horizon $\mathcal{T} := \{1 \ldots T\}$. Each EV $i \in V$ can be described, by a tuple $(a_i, e_i, d_i, \bar{r}_i)$ where $a_i$ is the EV's arrival time relative to the start of the optimization horizon, $e_i$ is its energy demand, $d_i$ is the duration of the session, and $\bar{r}_i$ is the maximum charging rate for EV i. The charging rates for each EV in each period solve the following problem:

$$SCH(V, U, \mathcal{R}): \min_{\hat{r}} U(\hat{r}) \text{ s.t. } \hat{r} \in \mathcal{R}$$

where the optimization variable $\bar{r} := (\bar{r}_i(1), \ldots, \bar{r}_i(T), i \in V)$ defines the scheduled charging rates of each EV over the optimization horizon $\mathcal{T}$. The utility function U(r) encodes the operator's objectives and the feasible set $\mathcal{R}$ the various constraints.

To illustrate, the objective $$U(r) := \sum_{\substack{i \in \mathcal{T} \\ i \in V}} (t - T) \, r_i(t)$$

is used to encourage EVs to finish charging as quickly as possible, freeing up capacity for future arrivals. In several embodiments, a feasible set $\mathcal{R}$ takes the form $$0 \leq r_i(t) \leq \bar{r}_i \quad a_i \leq t < a_i + d_i, i \in V \quad (1a)$$

$$r_i(t) = 0 \quad t < a_i, t \geq a_i + d_i, i \in V \quad (1b)$$

$$\sum_{t=a_i}^{d_i - 1} r_i(t) \leq e_i \quad i \in V \quad (1c)$$

$$f_j(r_1(t), \ldots, r_N(t)) \leq l_l(t) \quad t \in \mathcal{T}, l \in \mathcal{I} \quad (1d)$$

Constraints (1a) ensure that charging rate are non-negative and below their maximum $\bar{r}_i(1)$; (1b) ensure that an EV does not charge before its arrival or after its departure time; (1c) limits the total energy delivered to EV i to at most $e_i$; and (1d) enforce a set of given infrastructure limits $I_l(t)$ indexed by $l \in \mathcal{I}$.

In many embodiments, if the utility function is strictly decreasing in all elements of r, if it is feasible to meet all EV's energy demands, then constraint (1c) is observed to be tight. In general, it is possible that the energy delivered may not reach the user's requested energy due to their battery becoming full or congestion in the system.

ACN Data Collected

In many embodiments, ACN platform can enable the collection of detailed data about each charging session which occurs in the system. FIG. 8 shows a table which describes some of the relevant, data collected in accordance with an embodiment of the invention. In several embodiments, in order to obtain data directly from users, a mobile application can be utilized. In certain embodiments, a driver can first scan a quick response (QR) code on the EVSE which allows the adaptive EV charging application to associate the driver with a particular charging session. The driver can then input her estimated departure time and requested energy. This can be referred to as user input data. In certain embodiments, when a user does not use the mobile application, default values for energy requested and duration can be assumed and no user identifier may be attached to the session. In several embodiments, sessions with an associated user input can be referred to as claimed and those without as unclaimed.

Figure 9:
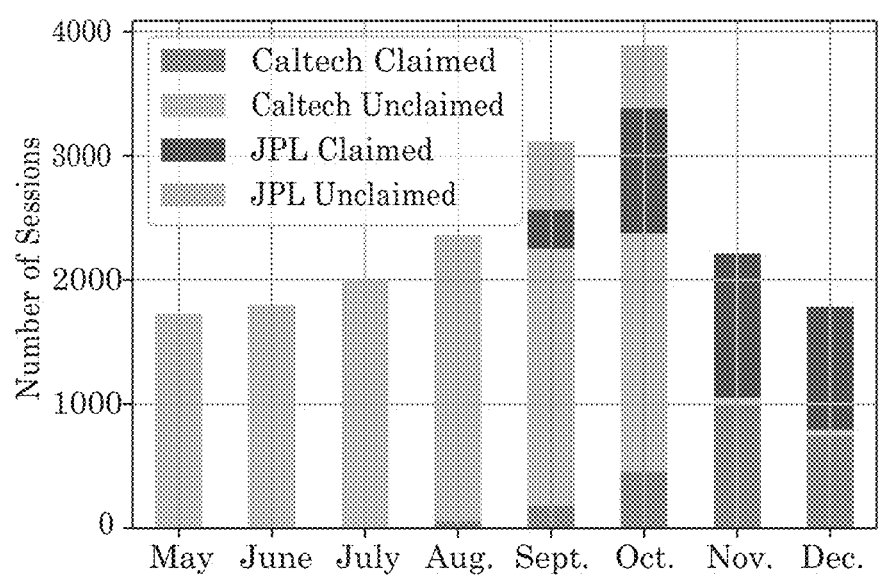
FIG. 9 shows data collected for a number of sessions from multiple sites in accordance with an embodiment of the invention.

In several embodiments, adaptive EV charging can focus on a 3-tuple $(a_i, d_i, e_i)$ in collected data for both user input and an actual measured behavior. Number of sessions collected from each site per month as well as whether these sessions were tagged with a user's input, i.e. claimed, is shown in FIG. 9 in accordance with an embodiment of the invention. Claimed sessions are useful for studying individual user behavior.

Understanding User Behavior
System Utilization

Figures 10A, 10B:
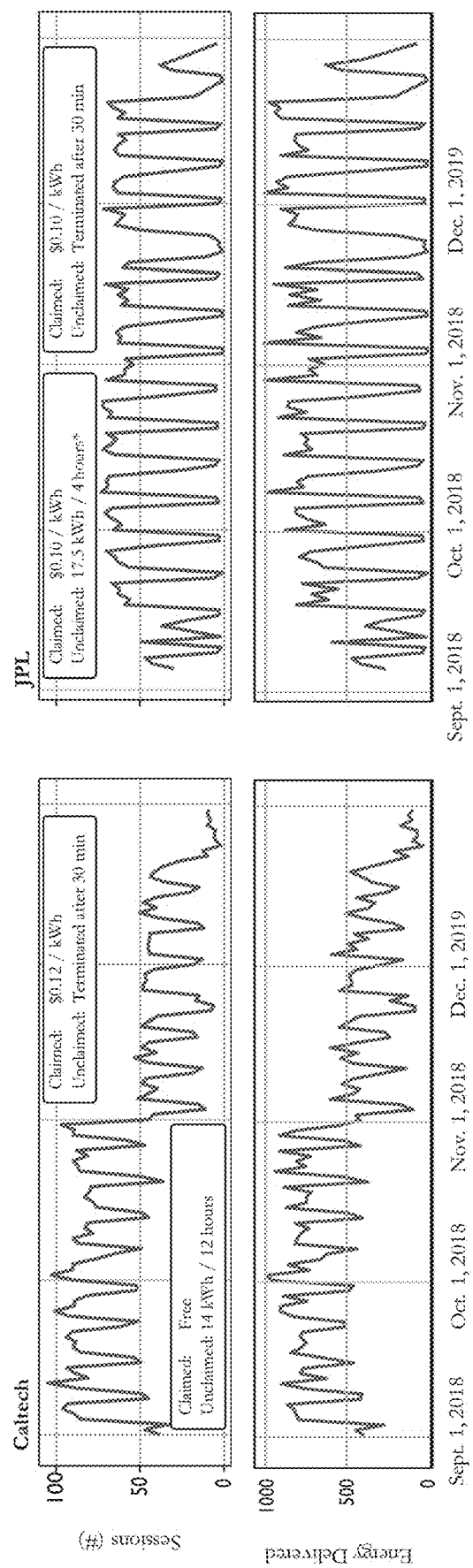
FIG. 10A shows system utilization data for the California Institute of Technology (Caltech) site in accordance with an embodiment of the invention.
FIG. 10B shows system utilization data for NASA's Jet Propulsion Laboratory (JPL) site in accordance with an embodiment of the invention.

EVSE utilization, specifically number of sessions served and amount of energy delivered each day, together with pricing information, and default parameters for unclaimed sessions are shown in FIG. 10A (Caltech) and FIG. 10B (JPL) in accordance with an embodiment of the invention. FIGS. 10A and 10B show that both sites display a cyclic usage pattern with much higher utilization during weekdays than on weekends, as expected for workplace charging. Furthermore, Caltech site, being a university and an open campus, has non-trivial usage on weekends. In contrast, JPL, as a closed campus, has next to no charging on weekends and holidays.

The data confirms the difference between paid and free charging facilities. During the first 2.5 years of operation the Caltech site EV charging was free for drivers. However, beginning Nov. 1, 2018, a fee of $0.12/kWh was imposed. This date can clearly be seen in FIG. 10A, as both the number of sessions per day and daily energy delivered decreased significantly. Because of an issue with site configuration, approximately half of the EVSEs at JPL, were free prior to Nov. 1, 2018. However at the JPL site, large decrease in utilization in terms of number of sessions or energy delivered after November 1 is not observed. This is likely due to the fact that demand for charging is high enough to overshadow any price sensitivity.

Arrival and Departure Data

Figure 11A:
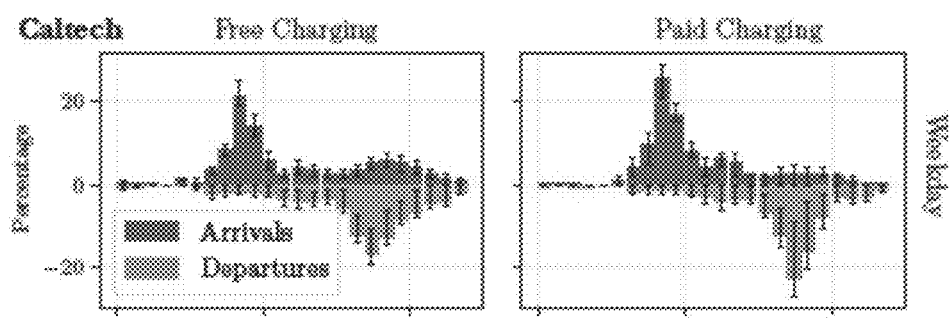
FIG. 11A shows distributions of weekday arrivals and departures for Caltech in accordance with an embodiment of the invention. The graph on the left is data for free charging and the graph on the right is data for paid charging.
Figure 11B:
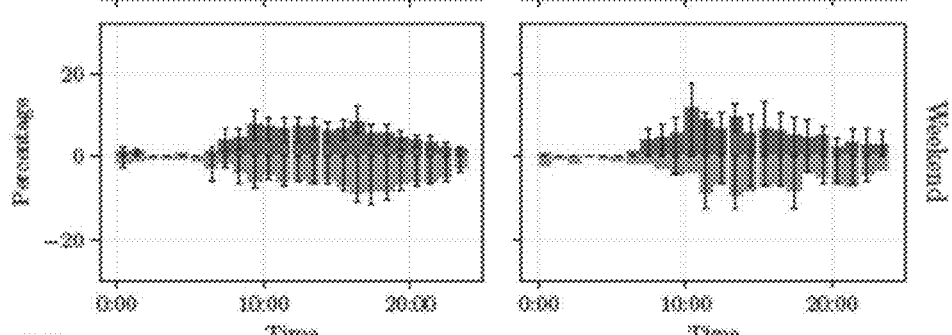
FIG. 11B shows distributions of weekend arrivals and departures for Caltech in accordance with an embodiment of the invention. The graph on the left is data for free charging and the graph on the right is data for paid charging.
Figure 11C:
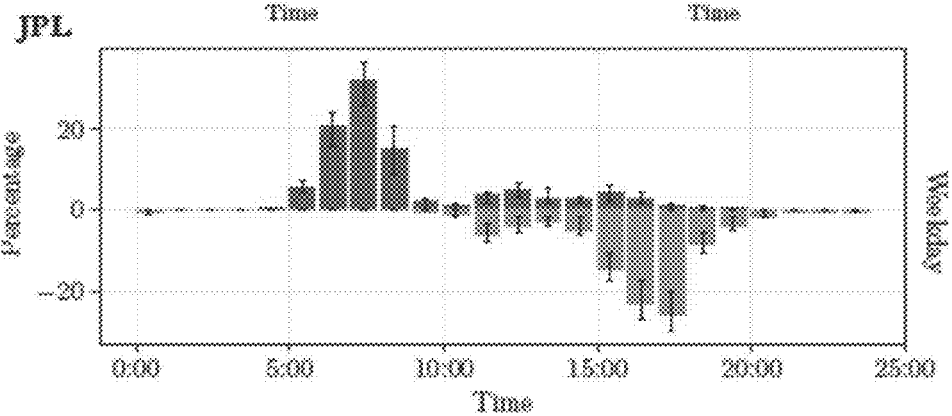
FIG. 11C shows distributions of weekday arrivals and departures for JPL in accordance with an embodiment of the invention.

Distributions of arrivals and departures for Caltech on weekdays and weekends for free charging and paid charging, and JPL on weekdays are shown in FIGS. 11A, 11B and 11C in accordance with an embodiment of the invention. For Caltech, the shape of the distributions are similar before and after paid charging was implemented. Two key differences can be noted in weekday charging between free and paid periods. First, the second peak around 6 pm vanishes. This is attributed to a decrease in community usage of the Caltech site after its charging costs became comparable to at-home charging. Second, the peak in arrivals (departures) around 8 am (5 pm) increases. This is expected as instituting paid charging has reduced community usage in the evening which leads to a higher proportion of users displaying standard work schedules.

The weekday arrival distribution has a morning peak at both sites. For conventional charging system, these peaks necessitate a larger infrastructure capacity and lead to higher demand charges. In addition, as EV adoption grows, the se morning spikes in demand could prove challenging for utilities as well. As expected, departures are analogous to arrivals. They begin to increase as the workday ends, with peaks in the period 5-6 pm at both Caltech and JPL.

Departures at JPL tend to begin earlier, which is consistent with the earlier arrival times while departures at Caltech tend to stretch into the night owing to the heterogeneity of individual schedules as well as later arrivals. Since the Caltech site is open to the public and is located on a university campus, it is used on the weekends as well. Arrivals and departures are much more uniform on weekends for both the unpaid and paid periods. This uniformity is due to the aggregation of many highly heterogeneous weekend schedules.

Driver and System Flexibility
Driver Laxity

The initial laxity of an EV charging session i is defined as $$LAX(i) = d_i - \frac{e_i}{\bar{r}_i}$$

$LAX(i)=0$ means that EV i must be charged at its maximum rate $\bar{r}$, over the entire duration $d_i$ of its session in order to meet its energy demand $e_i$. A higher value of $LAX(i)$ means there is more flexibility in satisfying its energy demand.

Figures 12A, 12B, 12C:
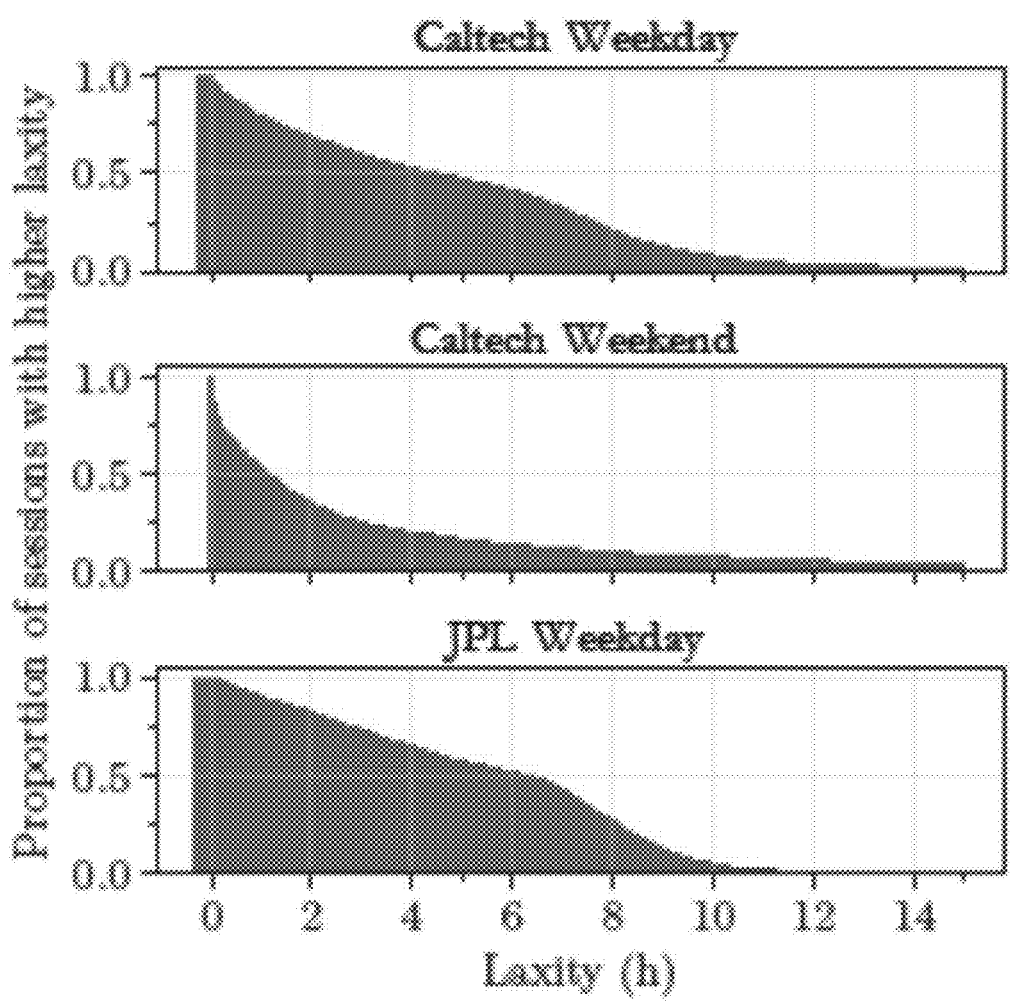
FIG. 12A shows a weekday distribution of initial laxities for Caltech site in accordance with an embodiment of the invention.
FIG. 12B shows a weekend distribution of initial laxities for Caltech in accordance with an embodiment of the invention.
FIG. 12C shows a weekday distribution of initial laxities for JPL site in accordance with an embodiment of the invention.
Figures 13A, 13B:
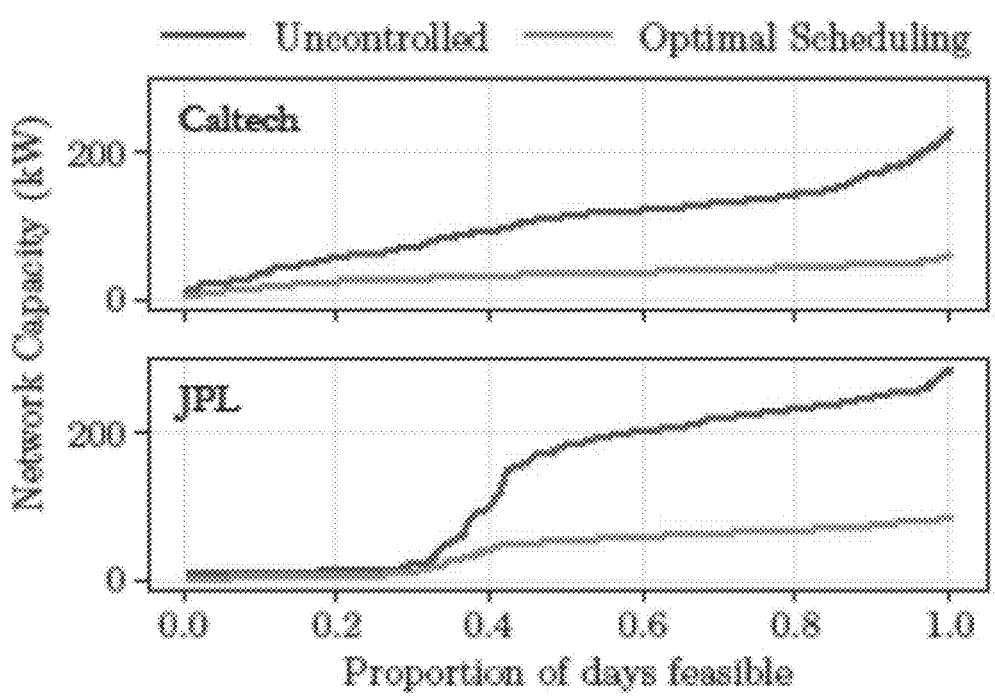
FIG. 13A shows a comparison of uncontrolled capacity and optimally scheduled capacity required for Caltech in accordance with an embodiment of the invention.
FIG. 13B shows a comparison of uncontrolled capacity and optimally scheduled capacity required for JPL in accordance with an embodiment of the invention.

Distribution of initial laxities are shown in FIGS. 12A (Caltech weekday), 12B (Caltech weekend) and 12C (JPL weekday) in accordance with an embodiment of the invention. For weekdays most EVs display high laxity. On weekends laxity tends to be lower as EV users tend to want to get charged and get on with their day. One way to quantify the aggregate flexibility of a group of EVs is the minimum system capacity needed to meet all their charging demands. A smaller system capacity requires a lower capital investment and operating cost for a charging operator. To calculate the minimum system capacity, $SCH(V, U_{cap}, \hat{\mathcal{R}})$ is solved for optimal charging rates $\bar{r}^*$, for each day in the data-set where V is the set of all EVs using the charging system in a day, $$U_{cap}(r) := \max_t \sum_{i \in \mathcal{V}} r_i(t)$$

and $\hat{\mathcal{R}}$ is equivalent to (1) except that (1c) is strengthened to equality. For simplicity, any infrastructure constraints (1d) in $\hat{\mathcal{R}}$ is not considered. The distribution of the minimum system capacity $U_{cap}(\bar{r}^*)$ per day in the data set is shown in FIGS. 13A (Caltech) and 13B (JPL). It shows that the adaptive EV charging platform would have been able to meet the demand for 100% of days in the data et with just 60 kW of capacity for Caltech and 84 kW for JPL, while conventional uncontrolled systems of the same capacity would only be able to meet demand on 22% and 38% of days respectively. For reference Caltech has an actual system capacity of 150 kW and JPL has 195 kW.

Learning User Behavior

In many embodiments, an underlying joint distribution of characteristics including (but not limited to) arrival time, session duration, and energy delivered based upon Gaussian mixture models (GMMs) is utilized. In several embodiments, the GM Ms are used to predict user behavior, optimally size onsite solar for adaptive EV charging, and control EV charging to smooth the so called Duck curve.

In certain embodiments, adaptive EV charging can utilize a GMM as a second-order approximation to the underlying distribution. An ACN data set can be modeled as follows to fit a GMM. Consider a data set X consisting of N charging sessions. The data for each session i=1, . . . , is represented by a triple $x_i=(a_i, d_i, e_i)$ in $R^3$ where $a_i$ denotes the arrival time, $d_i$ denotes the duration and $e_i$ is the total energy (in kWh) delivered. The data point $X_i$ are independently and identically distributed (i.i.d.) according to some unknown distribution. In practice, each driver in a workplace environment exhibits only a few regular patterns. For example, on weekdays, a driver may typically arrive at 8 am and leave around 6 pm, though her actual arrival and departure times may be randomly perturbed around their typical values. On weekends, driver behavior may change such that the same driver may come around noon. Therefore, let K be the number of typical profiles denoted by $\mu_1, \ldots, \mu_K$. Each data point $X_i$ can be regarded a corrupted version of a typical profile with a certain probability. Define a latent variable $Y_i=k$ if and only if $X_i$ is corrupted from $\mu_k$. Moreover, by the i.i.d. assumption, each incoming EV has an identical probability $\phi_k$ taking $\mu_k$, i.e., $\phi_k := \mathbb{P}(Y_i=k)$ for i=1, . . . N, k=1, . . . , K. Conditioned on $Y_i=k$, the difference $X_i - \mu_k$ that the profile $X_i$ deviates from the typical profile $\mu_k$ can be regarded as Gaussian noise. In this manner, assuming $Y_i=k$, let $X_i \sim \mathcal{N}(\mu_k, \Sigma_k)$ be a Gaussian random variable with mean $\mu_k$ and covariance matrix $\Sigma_k$. To estimate the underlying distribution and approximate it as a mixture of Gaussian distributions, it suffices to estimate the parameters $\theta = (\phi_k, \mu_k, \Sigma_k)_{k=1}^K$. The probability density of observing a data point x can then be approximated using the learned GMM as $$p(x|\theta) = \sum_{k=1}^{K} \phi_k \frac{\exp\left(-\|x-\mu_k\|^2_{\Sigma_k^{-1}}/2\right)}{\sqrt{(2\phi)^3 \det(\Sigma_k)}}$$

Population and Individual-Level GMMs

In many embodiments, adaptive EV charging can train GMMs based on a training data set $X_{Train}$, and predict the charging duration and energy delivered for drivers in a set $\mu$. The results are tested on a corresponding testing data set $X_{Test}$. As illustrated in FIG. 9, the training data collected at both Caltech and JPL can be divided into two parts: user-claimed data $X_C$ and unclaimed data $X_U$.

In certain embodiments, two different approaches are considered. A first, approach generates a population-level GMM (P-GMM) based on the overall training data $X_{Train} = X_C \cup X_U$. However, users can have distinctive charging behaviors. To achieve better prediction accuracy, adaptive EV charging can take advantage of the user-claimed data and predict the charging duration and energy delivered for each individual user. In a second approach, the claimed data can be partitioned into a collection of smaller data sets consisting of the charging information of each user in $\mu$. Therefore, $X_C = \cup_{j \in \mu} X_j$. Adaptive EV charging can then train individual-level GMMs (1-GMM) for each user $j \in \mu$ by fine tuning the weights of the components of the P-GM M with data from each of the users to arrive at a final model for each of them.

Distribution Learned by P-GMM

Figure 14A:
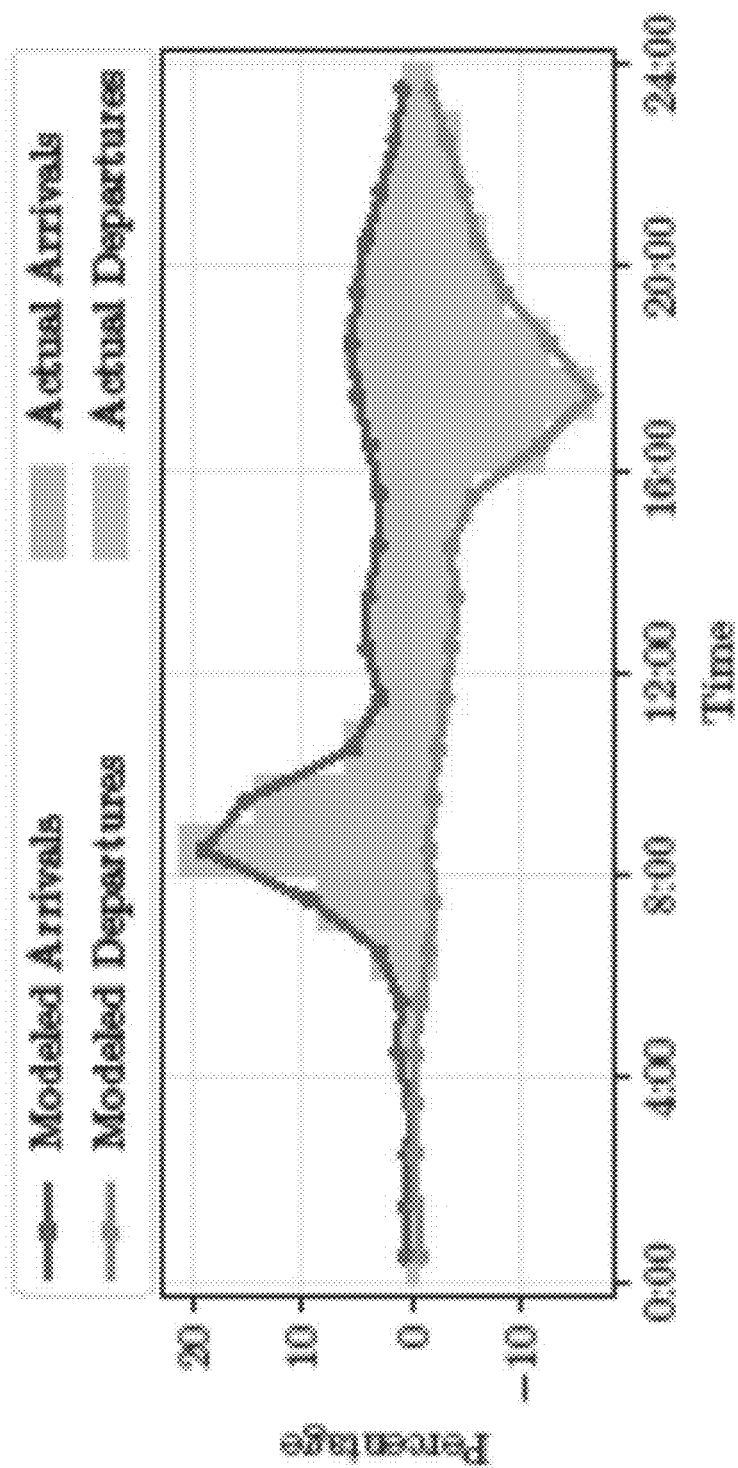
FIG. 14A shows a comparison of modelled arrivals and departure distributions with actual data for Caltech during a training period in accordance with an embodiment of the invention.
Figure 14B:
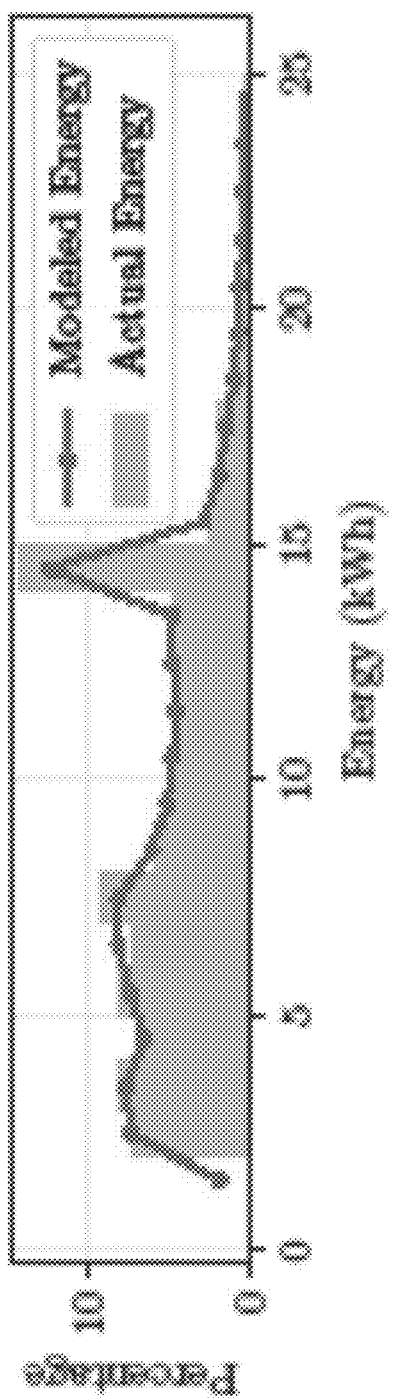
FIG. 14B shows a comparison of modelled energy, delivered with actual data for Caltech during a training period in accordance with an embodiment of the invention.
Figures 15A, 15B, 15C, 15D:
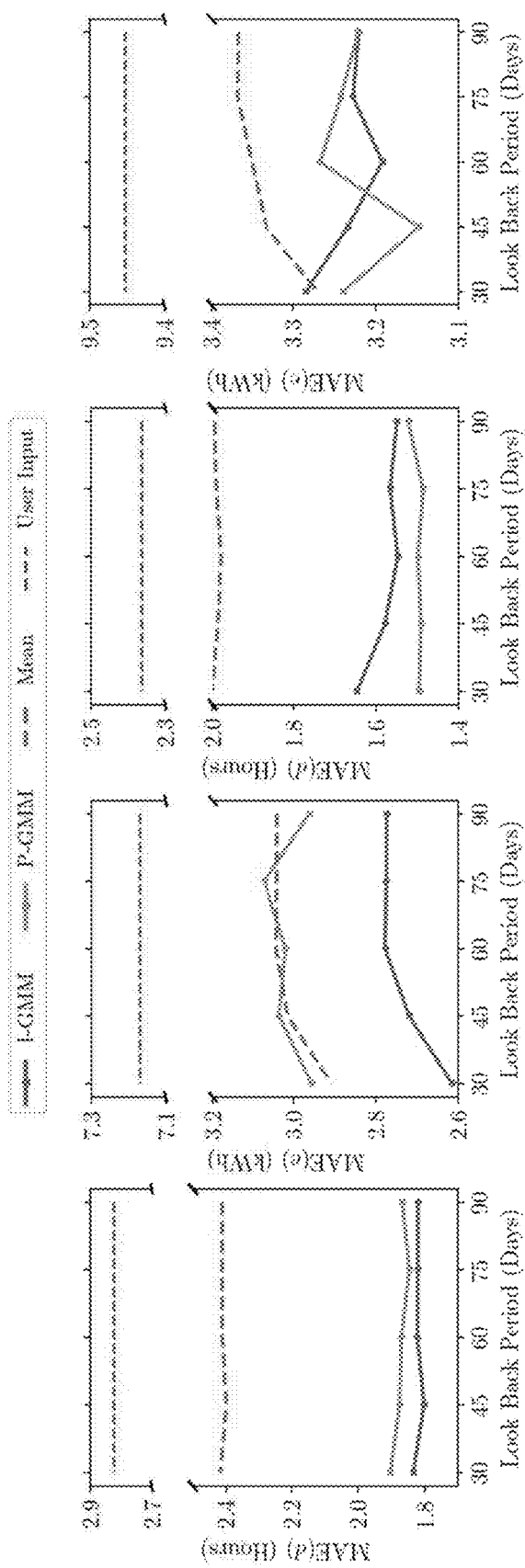
FIG. 15A shows individual and population Gaussian mixture models (GMM) prediction errors for Caltech duration as a function of look tack period in accordance with an embodiment of the invention.
FIG. 15B shows individual and population GMM prediction errors for Caltech energy as a function of look back period in accordance with an embodiment of the invention.
FIG. 15C shows individual and population GMM prediction errors for JPL duration as a function of look back period in accordance with an embodiment of the invention.
FIG. 15D shows individual and population GMM prediction errors for JPL energy as a function of look back period in accordance with an embodiment of the invention.

In certain embodiments, to evaluate the accuracy of adaptive EV charging's learned population-level GMM with respect to an underlying distribution, 100,000 samples were gathered from a P-GMM trained on data from Caltech site prior to Sep. 1, 2018. The data is plotted in FIG. 14A (distribution of these samples) and in FIG. 14B (empirical distribution from the training set). Departure time was plotted instead of duration directly as it demonstrates that adaptive EV charging model has learned not only the distribution of session duration but also the correlation between arrival time and duration. It can be seen in all cases that adaptive EV charging learned distribution matches the empirical distribution well.

Predicting User Behavior

In several embodiments, adaptive EV charging can utilize a GMM that has been learned from the ACN data set to predict a user's departure time and the associated energy consumption based on that user's known arrival time. Adaptive EV charging data shows that user input can be quite unreliable, partially because of a lack of incentives for users to provide accurate predictions. In many embodiments, adaptive EV charging platform shows that the predictions can be more precise using simple probabilistic models.

Calculating Arrival Time-Based Predictions

Let $\mathcal{U}$ denote the set of users. Suppose a convergent solution $\theta^{(j)} = (\phi_k^{(j)}, \mu_k^{(j)}, \Sigma_k^{(j)})_{k=1}^K$ is obtained for user $j \in \mathcal{U}$ where $\mu_k^{(j)} := (a_k^{(j)}, k_k^{(j)}, e_k^{(j)})$ and the user's arrival time is known a priori as $\tilde{a}^{(j)}$. For the sake of completeness, the following formulas are used for predicting a duration $\bar{d}^{(j)}$ and energy to be delivered $\bar{e}^{(j)}$ as conditional Gaussians of the user $j \in \mu$:

$$\bar{d}^{(j)} = \sum_{k=1}^{K} \bar{\phi}_k^{(j)} \left( d_k^{(j)} + (\tilde{a}^{(j)} - a_k^{(j)}) \frac{\Sigma_k^{(j)}(1,2)}{\Sigma_k^{(j)}(1,1)} \right) \quad (2)$$

$$\bar{e}^{(j)} = \sum_{k=1}^{K} \bar{\phi}_k^{(j)} \left( e_k^{(j)} + (\tilde{a}^{(j)} - a_k^{(j)}) \frac{\Sigma_k^{(j)}(1,3)}{\Sigma_k^{(j)}(1,1)} \right) \quad (3)$$

where $\Sigma_k^{(j)}(1,1)$, $\Sigma_k^{(j)}(1,2)$ and $\Sigma_k^{(j)}(1,3)$ are the first, second and third entries in the first column (or row) of the co-variance matrix $\Sigma_k^{(j)}$ respectively. Denoting by $p(\cdot|\mu, \sigma^2)$ the probability density for a normal distribution with mean $\mu$ and variance $\sigma^2$, the modified weights conditioned on arrival time in (2) and (3) above are $$\bar{\phi}_k := \frac{p\left(\tilde{a}^{(j)} | a_k^{(j)}, \Sigma_k^{(j)}(1,1)\right)}{\sum_{k=1}^{K} p\left(\tilde{a}^{(j)} | a_k^{(j)}, \Sigma_k^{(j)}(1,1)\right)}$$

Error Metrics

In many embodiments, both absolute error and percentage error are considered when evaluating duration and energy predictions.

Recall that $\mathcal{U}$ is the set of all users in a testing data set $X_{Test}$. Let $\mathcal{A}_j$ denote the set of charging sessions for user $j \in \mathcal{U}$. The Mean Absolute Error (MAE) is defined in (4) to assess the overall deviation of the duration and energy consumption. For a testing data set $X_{Test}=\{(a_{i,j}, d_{i,j}, e_{i,j})\}_{j\in \mathcal{U}, i\in \mathcal{A}_j}$, the corresponding MAEs for duration and energy are represented by MAE(d) and MAE(e) with $$MAE(x) := \sum_{j\in\mathcal{U}} \frac{1}{|\mathcal{U}|} \sum_{i\in\mathcal{A}_j} \frac{1}{|\mathcal{A}|_j} |x_{i,j} - \hat{x}_{i,j}| \qquad (4)$$

where $\hat{x}_{i,j}$ is the estimate of $x_{i,j}$ and x=d or c.

In several embodiments, a symmetric mean absolute percentage error (SMAPE) can be used to avoid skewing the overall error by the data points wherein the duration and energy consumption take small values. The corresponding SMAPEs for duration and energy are represented by SMAPE(d) and SMAPE(e) with $$SMAPE(x) := \sum_{j\in\mathcal{U}} \frac{1}{|\mathcal{U}|} \sum_{i\in\mathcal{A}_j} \frac{1}{|\mathcal{A}|_j} \left|\frac{x_{i,j} - \hat{x}_{i,j}}{x_{i,j} + \hat{x}_{i,j}}\right| \times 100\% \qquad (5)$$

Results and Discussion

In accordance with an embodiment of the invention, MAE(d) and MAE(e) for I-GMM and P-GMM on Caltech data set are illustrated in FIGS. 15A, 15B, 15C and 15D as a function of the look back period which defines the length of the training set. Users with larger than 20 sessions during Nov. 1, 2018 and Jan. 1, 2019 are included in $\mathcal{U}$ and tested. Note that the size of the training data may not be proportional to the length of periods since in general there is less claimed session data early in the data set as shown in FIGS. 10A, 10B, and 10C. The 30-day testing data was collected from Dec. 1, 2018 to Jan. 1, 2019. Performance of prediction accuracy with different training data size was analyzed by training the GMMs with data collected from five time intervals ending on Nov. 30, 2018 and starting on Sep. 1, 2018, Sep. 15, 2018, Oct. 1, 2018, Oct. 15, 2018 and Nov. 1, 2018 respectively. The GMM components are initialized using k-means clustering as implemented by the Scikit learn GMM package. Since it is not deterministic, this initialization can be repeated a number of times (e.g. 25 times) and the model with the highest log-likelihood on the training data set selected. Grid search and cross validation can be used to find the best number of components for each GMM. As can readily be appreciated, the specific process utilized for initializing the GMM is largely dependent upon the requirements of a specific application.

As illustrated in FIGS. 15A, 15B, 15C and 15D, for the JPL data set with testing data obtained from Dec. 1, 2018 to Jan. 1, 2019, the 60-day training data gives the best overall performance. This is in agreement with user behavior changing over time and there is a trade-off between data quality and size. The Caltech data set also displays this trade-off; however, the best performance was found for only a 30-day training set. This is likely because there was a transition from free to paid charging on November 1, which meant that data prior to that date had very different properties.

Figure 16:
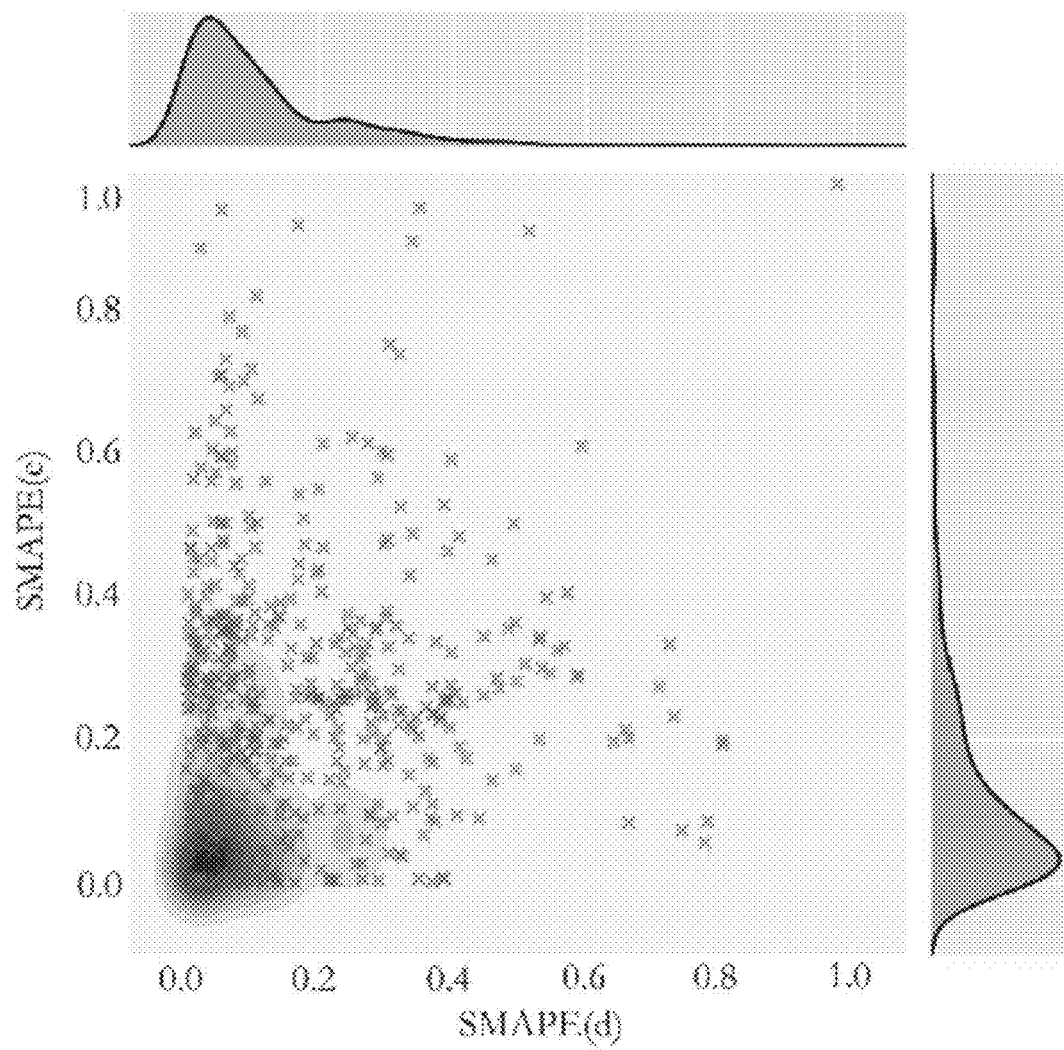
FIG. 16 shows average symmetric mean absolute percentage error (SMAPE) for a JPL data set in accordance with an embodiment of the invention.

Hence, for the JPL data set, adaptive EV charging can fix the training data as the one collected from Oct. 1, 2018 to Dec. 1, 2018 and show the scatterings of SMAPEs for each session in the testing data (from Dec. 1, 2018 to Jan. 1, 2019) in FIG. 16. The SMAPEs are concentrated on small values with a few outliers and high-quality duration prediction has a positive correlation with high-quality energy prediction. As a comparison, user input SMAPEs, shown as Xs, are much worse.

FIG. 17 shows a table which displays the average SMAPEs for the various methods tested in accordance with an embodiment of the invention. For Caltech and JPL, the results displayed use the 30 and 60-day training data respectively. For reference the error is also calculated for two additional ways to predict user parameters: 1) a mean of the training data $X_j$ is used as adaptive EV charging prediction for each user, 2) user input data is utilized directly as the prediction. Note that to account for stochasticity in the GMM training process, the results in FIGS. 15A, 15B, 15C, and 15D and FIG. 17 are obtained via 50 Monte Carlo simulations.

User input data conspicuously gives the least accurate overall prediction. In certain embodiments, significant improvements are me made by leveraging tools from statistics and machine learning to better predict user behaviors, e.g., using GMMs.

Solar Sizing

In many embodiments, collection of ACN data and training of models can be utilized to determine the sizing of solar arrays in the manner described in the U.S. Provisional Patent Application Ser. No. 62/803,157 entitled "Date-Driven Approach To Joint EV And Solar Optimization Using Predictions" to Zachary J. Lee et. al., filed Feb. 8, 2019, and in the U.S. Provisional Patent Application Ser. No. 62/964,504 entitled "EV Charging Optimization Using Adaptive Charging Network Data" to Zachary J. Lee et. al., filed Jan. 22, 2020, the disclosures of which are herein incorporated by reference in their entirety.

Smoothing the Duck Curve

In several embodiments, adaptive EV charging platform can utilize user data to smooth the EV energy demand over the course of the day and therefore smooth out the Duck curve. In certain embodiments, adaptive EV charging platform can be used for controlling the charging of large number of EVs in order to alleviate the steep ramping conditions caused by the Duck curve.

In certain embodiments, the problem of minimizing ramping can be formulated as $$SCH(V, U_{ramp}, \hat{\mathcal{R}}) \qquad (6)$$

where the objective is denoted by $$U_{ramp} := \sum_{t\in\mathcal{T}} (\hat{D}(t) - \hat{D}(t-1))^2 \qquad (7)$$

and $$\hat{D}(t) := \sum_{i\in\mathcal{V}} r_i(t) + D(t) \qquad (8)$$

Here D(t) is the net demand placed on the grid after non-dispatchable renewable energy is subtracted from the total demand. In certain embodiments, flexible loads such as water heaters, appliances, pool pumps, etc. are treated as being fixed.

Case Studies

In many embodiments, adaptive EV charging platform can be utilized to analyze a net demand curve from California independent system operator (CAISO). For example, for the 2018 case analysis, three levels of EV penetration in California were analyzed based on the current number of EVs in California (350,000) and the state's goals for 2025

(1.5 million) and 2030 (5 million). For this case analysis, an optimistic assumption can be made that all of the electric vehicles would be available for workplace charging. The length of each discrete time interval is set in the optimization to be 15 min.

In several embodiments, to reduce the computational burden in solving (6) for millions of EVs, a representative sample of n EVs can be used drawn from the learned distribution and scale down the net demand curve $\overline{D}(t)$ from CAISO by the ratio of a to the desired number of EVs, denoted by N. Define $\hat{D}(t):=(n/N)\tilde{D}(t)$. (6)-(8) can be solved for D(t) and this representative sample. Finally, the optimal net demand curve can be scaled, $\hat{D}^*(t)$, by N/n to arrive at a final curve in the original units. For this experiment, n=1,000.

Figure 18A:
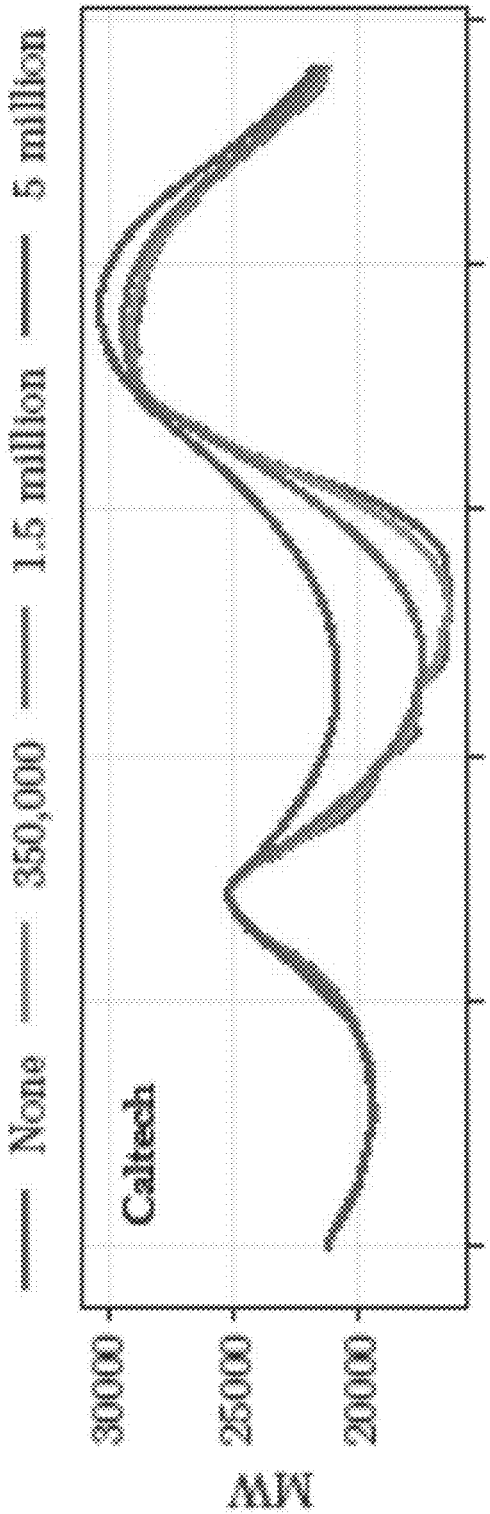
FIG. 18A shows net energy demand curves after optimal smoothing for Caltech in accordance with an embodiment of the invention.
Figure 18B:
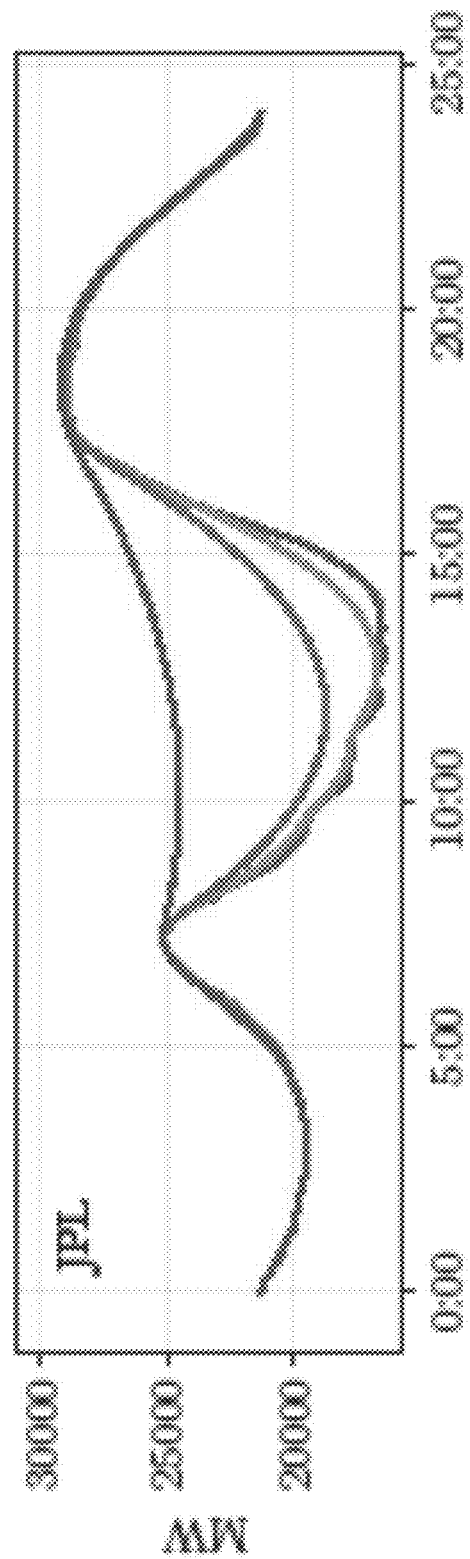
FIG. 18B shows net energy demand curves after optimal smoothing for JPL in accordance with an embodiment of the invention.

FIGS. 18A and 18B show the resulting optimal net demand curves $\hat{D}^*(t)$, for both the Caltech data and the JPL data. Even with only 350,000 EVs, a non-trivial smoothing can be observed of the net demand curve. With 1.5 million EVs under control, a significant filling of the "belly" of the duck can be observed as well as a reduction in the morning and afternoon ramping requirements. By the time 5 million EVs under control is reached, an almost complete smoothing of the duck can be observed in the JPL case. Note that for the Caltech distribution, 5 million EVs lead to a noticeable increase in peak demand. This is due to fact that the distribution used for free charging includes a significant number of short sessions that begin around 5-7 pm, thus requiring adaptive EV charging platform to charge the EVs during the peak of background demand. This demonstrates benefits of concentrat-ing EV charging during normal working hours, for which the JPL distribution is representative.

Quantitative Results

Figure 19A:
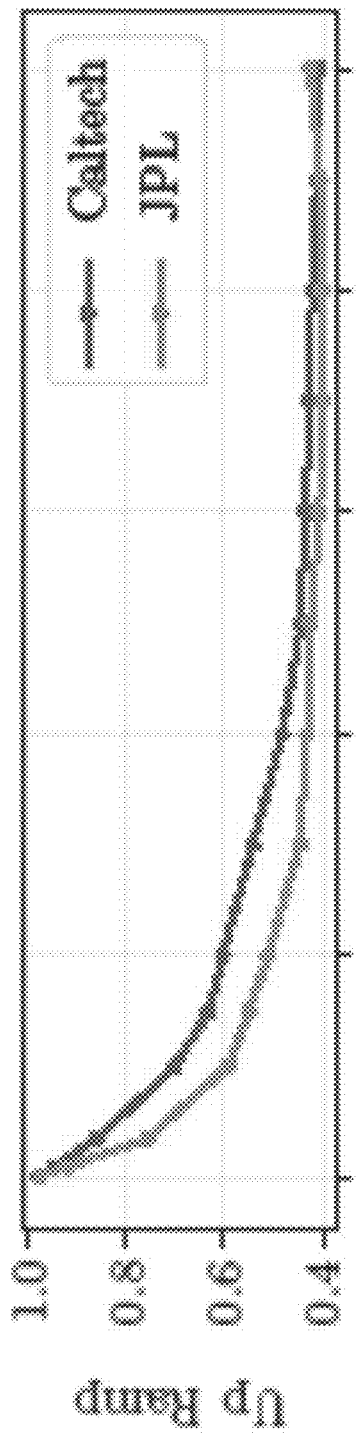
FIG. 19A shows up ramp rate as a function of number of EVs in accordance with an embodiment of the invention.
Figure 19B:
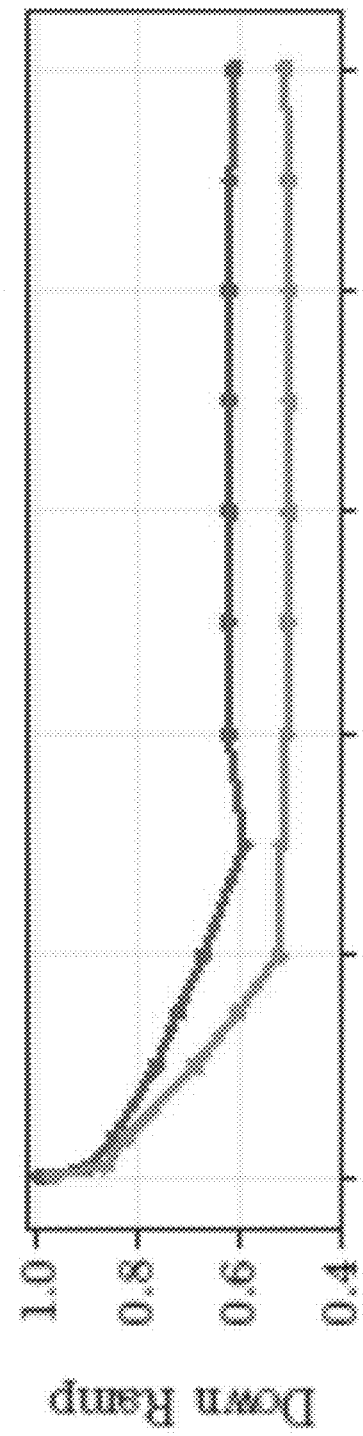
FIG. 19B shows down ramp rate as a function of number of EVs in accordance with an embodiment of the invention.
Figure 19C:
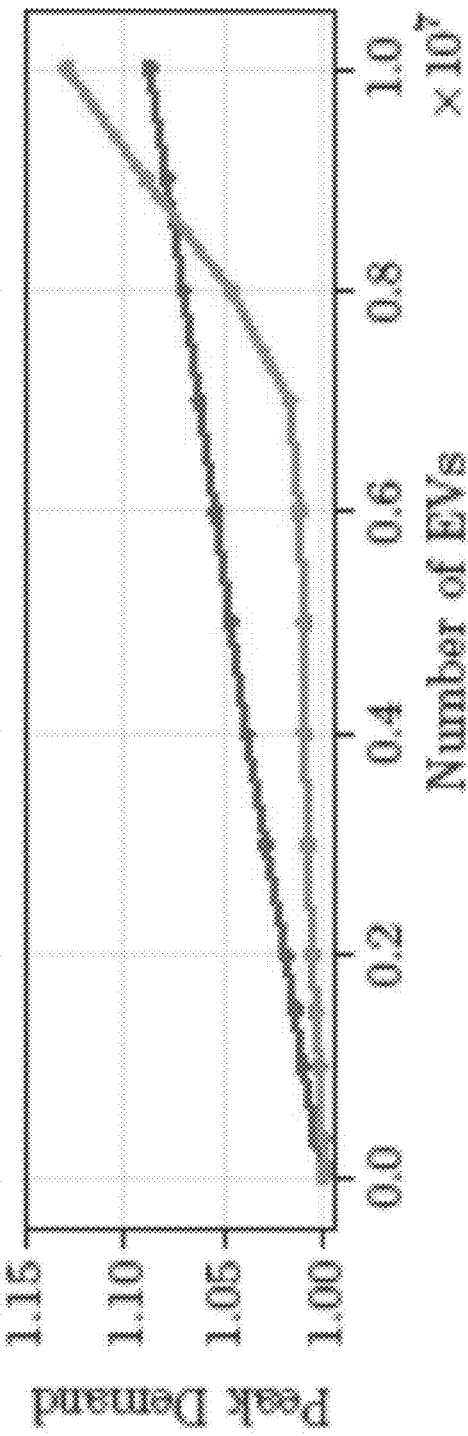
FIG. 19C shows peak demand as a function of number of EVs in accordance with an embodiment of the invention.

In many embodiments, in order to determine the amount of smoothing of the Duck curve, the number of EVs under control can be varied from 10,000 to 10 million for each distribution. Each group EVs can be scheduled by using (6) and measuring the resulting maximum up and down ramps as well as the peak demand. The results are shown in FIGS. 19A, 19B, and 19C.

In several embodiments, with as few as 2 million EVs under control, up and down ramping can be reduced by nearly 50% with only a 0.6% increase in peak demand when using the JPL distribution.

Data-Based Battery Fitting

In many embodiments, a model for an EV battery can be fitted using charging data for a given EV. In several embodiments, using a transformation of charging time series into the energy domain, data processing techniques, and model fitting techniques, a piecewise function can be fitted to a battery that captures different modes of battery charging behavior.

Battery Model in Energy Domain

In many embodiments, ACN data can provide useful information on charging sessions, including time series for pilot: (charging) signal and charging rate, and energies requested and delivered. In certain embodiments, battery models can be fitted depending on objectives. In several embodiments, a best fit battery model is employed using a time series data. In many embodiments, a piecewise linear 2-stage model can be fitted for a battery. Fitting to this battery model entails finding optimal values for the parameters $r^{max}$ and h, where $r^{max}$ is the maximum charging rate in the constant charging regime and h is the threshold state of charge at which decrease in charging rate begins. In certain embodiments, the problem can be analyzed in the energy domain, in which case the governing equation becomes:

$$\bar{r}(\hat{e}) = \begin{cases} r^{max} & \hat{e} + e(0) \leq e^h \\ r^{max} \left( \frac{\bar{e} - \hat{e} - e(0)}{\bar{e} - e^h} \right) & \hat{e} + e(0) > e^h \end{cases}$$

For a given session, $\hat{e}$, $e^h$, e(0), and Y are energy delivered, threshold energy, initial energy, and battery capacity respectively.

Looking at one session and assuming initial energy is 0, rewriting the governing equation as $$\bar{r}(\hat{e}) = \begin{cases} r^{max} & \hat{e} \leq e^h \\ r^{max} + \left( -\frac{r^{max}}{\bar{e} - e^h} \right) \hat{e} - \left( -\frac{r^{max}}{\bar{e} - e^h} \right) e^h & \hat{e} > e^h \end{cases}$$

3 parameters can be fitted in a linear regression on a piecewise linear equation: $e^h$, $r^{max}$, and a slope that depends on $\bar{e}$ (and the other parameters).

Generating Energy Domain Data

In many embodiments, ACN data provides a time series of charging rate and pilot signal. For the purposes of this fitting, charging rates for which the pilot signal was not binding can be used; that is, the pilot signal was some threshold above the charging rate. For these charging rates, the battery is charging at its maximum possible rate at that time, and charging rates can be used in the battery fitting. For charging rates within some threshold of the pilot signal, it is unknown if the charging rate is limited by the pilot signal, thus those rates cannot be used to determine a maximal charging rate profile. Further, EVs may spend a significant amount of time charging at 0A while having a nonzero pilot signal (due to the deadband at 6A or the pilot setpoint at 8A). Thus, charging rates of 0A are also not considered.

In several embodiments, once a time series of nonzero charging rates is obtained which is not bound by the pilot signal, these charging rates can be converted into an energy delivered vs. charging rat graph. Each charging rate can have a time over which it was applied, which, when combined with the charger voltage, provides a time series of energy delivered. This can then be plotted against charging rate.

In many embodiments, despite the aforementioned time series processing, noisy behavior is still present in the charging profile. Much of this behavior consists of sudden dips in the charging signal (i.e. over just one timestep). Because the battery equation is piecewise linear, median filtering will preserve the functional form of the charging profile (in the energy domain), while also being robust to window size. In certain embodiments, a median filter is used, but other filtering methods may also be used to bring the data closer to the appropriate functional form. For example, the charging rate in the energy domain is not expected to ever increase significantly (after accounting for the pilot signal), therefore a filter based on that criterion may also be utilized.

Fitting Over Multiple Sessions

In many embodiments, after obtaining a clean charging rate vs. energy delivered curve, an optimization library can be used such as scipy.optimize to fit the energy domain battery equation to the data, yielding parameter values for $e^h$, $r^{max}$, and $\bar{e}$. If this is the only session for this user, the analysis can be stopped at this point with a battery model associated with only this session. However, with multiple sessions per user an even more accurate battery model can be obtained. Note that in the single-session fitting, battery initial charge of 0 is assumed.

In many embodiments, for multiple sessions for a single user, assuming that the single user has one vehicle (and thus one battery), each individual session can be fitted for the user, and then the energy domain charging profile for each session can be shifted such that the $e^h$'s are aligned to the maximum $e^h$ over all sessions. For instance, if one session yielded an $e^h$ of 1 kWh, while another yielded 4 kWh, all the points of the first session would be shifted by 3 kWh. This is akin to assigning an initial charge to the battery for each session, with one session (the session that sets the max $e^h$) having an initial charge of 0 kWh. After this shifting is done for all sessions for a given user, the fit to the model is done again, this time with data from all sessions.

In certain embodiments, the resultant fit gives accurate parameters for the battery's governing equations for one user under some model assumptions. In many embodiments, fitted parameters for a session (along with an initial energy estimate yielded by the shifting step) may be associated with that session in ACN data, and this fitted data may then be used in simulation, such that accurate charging based on real user charging behavior is obtained. The models for these batteries may be included in a model predictive control or other optimization framework to improve scheduling. In several embodiments, the fidelity of these fitted models may be tested by feeding the recorded pilot signals from ACN data into a ACN-Sim simulator (or another simulator). Also, as this process yields battery parameters for each user, clusters of users with similar batteries can be determined, and those clusters can be used to improve simulation models, match users to car models, or assign batteries to unclaimed, unfittable sessions following a distribution learned from the battery parameter clusters. At the individual user level, battery models could be used to infer metrics such as battery health.

Possible Relaxations

In many embodiments, a user having multiple charging sessions is not necessary if one trace demonstrates most battery modes of behavior. Even if this isn't the case, an accurate model can be found that captures some of the battery behavior (like max charging rate), which is better than blind guessing. In several embodiments, this process can be employed for battery models other than linear 2 stage. Fitting to different functions may require different data processing and curve matching techniques. In certain embodiments, the data pre-processing (accounting for the pilot signal, median filtering, etc.) is only one possible pipeline for this analysis. Different filters, fitting directly to the time series, removing different parts of the charging rate data, etc. are all possible alternatives. In certain embodiments, an actual fitting process uses linear regression to find optimal parameters. Likewise, the shifting step, in which the threshold energy parameters for each session are aligned, may be done by matching other parameters, such as x intercept or max rate, or by fitting each session to an aggregate session curve calculated from all sessions, recording the optimal shifts used to match each session to the aggregate curve. The general idea in that step is to somehow align the data from all sessions to yield an aggregate data set for which fitting to a single set of parameter values makes sense.

Worst-Case Linear Two Stage Battery Fitting

In certain embodiments, such as when data is noisy, sparse, or unclaimed, or in certain simulations focusing on tail behavior, charging sessions are mapped to a worst-case scenario in which tail-behavior is maximized. Then the battery fitting objectives are twofold. First, given an energy delivered and a duration of the stay, the minimum total battery capacity is to be calculated such that it is feasible to deliver the requested energy within the specified duration when charging at maximum rate. Second, given that the minimum feasible total battery capacity was calculated, the maximum initial charge is determined such that a requested energy is delivered for this battery. In many embodiments, an amount of time the battery charges is increased in the non-ideal region, allowing an easier analysis of the effects of battery tail behavior on EV charging.

In several embodiments, assuming that charging is always at the maximum possible rate, the maximum rate of charge can be express $\bar{r}$ (in amps) as the rate equation $$\bar{r}(\zeta) = \begin{cases} r^{max} & \zeta \leq h \\ r^{max}\left(\dfrac{1-\zeta}{1-h}\right) & \zeta > h \end{cases}$$

Here, $r^{max}$ is the maximum rate of charge under ideal conditions, $\zeta$ is the state of charge of the battery, and h is the battery state of charge at which the battery transitions from ideal to non-ideal behavior, also known as the threshold or transition state of charge. If the maximum battery capacity is given $\bar{e}$ and the voltage of charging V in volts, the above equation can be expressed in terms of the rate of change of state of charge. To do this, note that $$\zeta^{max} = \frac{\partial \zeta}{\partial t} = \frac{r^{max} \cdot V}{1000\bar{e}}$$

assuming $\bar{e}$ is in kWh. Then, the rate equation may be rewritten in terms of the rate of change of state of charge $\zeta$:

$$\bar{\zeta} = \begin{cases} \zeta^{max} & \zeta \leq h \\ \zeta^{max}\left(\dfrac{1-\zeta}{1-h}\right) & \zeta > h \end{cases}$$

This is a differential equation with two cases that depend on the initial condition $\zeta(0)=\zeta_0$. In the first case, if $\zeta_0 > h$, the only governing differential equation that applies is $$\bar{\zeta} = \zeta^{max}\left(\frac{1-\zeta}{1-h}\right)$$
$$\zeta(0) = \zeta_0$$

which has the solution $$\zeta(t) = 1 + \exp\left(\frac{\zeta^{max} t}{h-1}\right)(\zeta_0 - 1)$$

In the second case, $\zeta_0 \leq h$ and there are two individual differential equations to solve with different initial conditions. First, solve $\bar{\zeta} = \zeta_{max}$ with initial condition $\zeta(0) = \zeta_0$, which has solution $\zeta(t) = \zeta^{max}t + \zeta_0$. Thus, $$\bar{\zeta} = \zeta^{max}\left(\frac{1-\zeta}{1-h}\right)$$

$$\zeta\left(\frac{h-\zeta_0}{\zeta^{max}}\right) = h$$

The reason for the above initial condition is that the second differential equation starts taking effect when $\zeta \geq h$. The ideal region was charged up until this point, the time at which this transition occurs is $(h-\zeta_0)/\zeta^{max}$ and at this time $\zeta(t) = h$. This differential equation has solution $$\zeta(t) = 1 + \exp\left(\frac{\zeta^{max}t + \zeta_0 - h}{h-1}\right)(h-1)$$

Combining all the equations, the following formula is arrived at for state of charge as a function of initial charge $\zeta_0$ and charging time t assuming charging is performed at the maximum possible $\bar{\zeta}$:

$$\zeta(\zeta_0, t) = \begin{cases} \zeta^{max}t + \zeta_0 & \zeta_0 < h, t \leq \frac{h-\zeta_0}{\zeta^{max}} \\ 1 + \exp\left(\frac{\zeta^{max}t + \zeta_0 - h}{h-1}\right)(h-1) & \zeta_0 < h, t > \frac{h-\zeta_0}{\zeta^{max}} \\ 1 + \exp\left(\frac{\zeta^{max}t}{h-1}\right)(\zeta_0 - 1) & \zeta_0 \geq h \end{cases}$$

The problem discussed at the beginning of this section can be restated as, given a fixed $\Delta\zeta$ and t (and assuming the other constants are fixed), find the maximum $\zeta_0$ such that $\zeta(\zeta_0, t) - \zeta_0 \geq \Delta\zeta$. Although there is a way to solve this problem in a closed form, it is simpler and more stable to solve this problem in steps, outlined below:

1. Assume $\zeta_0 \geq h$. Then, $$\zeta(\zeta_0, t) = 1 + \exp\left(\frac{\zeta^{max}t}{h-1}\right)(\zeta_0 - 1)$$

$$\zeta(\zeta_0, t) - \zeta_0 = \left(\exp\left(\frac{\zeta^{max}t}{h-1}\right) - 1\right)(\zeta_0 - 1) = \Delta\zeta$$

Note that in this case, $\Delta s_t(\zeta_0)$ (that is, $\zeta(\zeta_0, t) - \zeta_0$ with constant t) is decreasing in $\zeta_0$, as the coefficient of $\zeta_0$ is negative ($h-1<0$). Thus, finding the minimum $\zeta_0$ is equivalent to finding the $\zeta_0$ for which exactly $\Delta\zeta$ state of charge is delivered. Inverting the above expression for $\Delta s_t(\zeta_0)$, thus $$\zeta_0 = \left(\exp\left(\frac{\zeta^{max}t}{h-1}\right) - 1\right)^{-1}$$

$\zeta_0$ can be calculated directly, and then checked if the assumption that $\zeta_0 \geq h$ holds. If so, the answer has been found. If not, it is known that $\zeta_0 < h$ and must consider the other two cases of the expression for $\zeta$.

2. Assuming $\zeta_0 < h$ and writing the piecewise conditions in terms of $\zeta_0$, thus:

$$\Delta s_t(\zeta_0) = \begin{cases} \zeta^{max}t & \zeta_0 \leq h - \zeta^{max}t \\ 1 + \exp\left(\frac{\zeta^{max}t + \zeta_0 - h}{h-1}\right)(h-1) - \zeta_0 & \zeta_0 > h - \zeta^{max}t \end{cases}$$

In certain embodiments, the maximal $\zeta_0 \geq h - \zeta^{max}t$ in known because if $\zeta_0$ were any lower, the same amount of energy would be delivered, since $\zeta^{max}t$ does not depend on $\zeta_0$. Thus $$\Delta s_t(\zeta_0) = 1 + \exp\left(\frac{\zeta^{max}t + \zeta_0 - h}{h-1}\right)(h-1) - \zeta_0$$

This function can be inverted if special functions are used (namely, the product log, or Lambert W function) but such functions are unstable in the range of possible inputs, so instead, a search for an optimal $\zeta_0$ is done. First, note the following:

$$\frac{\partial \Delta\zeta}{\partial \zeta_0} = \exp\left(\frac{\zeta^{max}t + \zeta_0 - h}{h-1}\right) - 1 \leq 0$$

Since $\zeta_0 \geq h - \zeta^{max}t$, $\zeta^{max}t + \zeta_0 - h \geq 0$ and $\delta\Delta\zeta/\delta\zeta_0$ is always negative (except the edge of the search interval, $\zeta_0 = h - \zeta^{max}t$, where it is 0). Since $\Delta s_t(\zeta_0)$ is decreasing in $\zeta_0$, find the $\zeta_0$ such that $\Delta s_t(\zeta_0) = \Delta\zeta$. In certain embodiments, this can be done by binary search since the function searched for is decreasing. Thus, a maximum $\zeta_0$ is obtained efficiently.

Linear 2 Stage Battery Charging

Given an initial state of charge (j, a charging duration t (t=1 if a charge for one period is performed), a threshold h, a capacity $\bar{e}$, a voltage V, and a maximum charging rate $r^{max}$, the battery state of charge is determined after t periods as:

$$\zeta(\zeta_0, t) = \begin{cases} \zeta^{max}t + \zeta_0 & \zeta_0 < h, t \leq \frac{h-\zeta_0}{\zeta^{max}} \\ 1 + \exp\left(\frac{\zeta^{max}t + \zeta_0 - h}{h-1}\right)(h-1) & \zeta_0 < h, t > \frac{h-\zeta_0}{\zeta^{max}} \\ 1 + \exp\left(\frac{\zeta^{max}t}{h-1}\right)(\zeta_0 - 1) & \zeta_0 \geq h \end{cases}$$

$$\zeta^{max} = \frac{r^{max} \cdot V}{1000\bar{e}}$$

Although the present invention has been described in certain specific aspects, many additional modifications and variations would be apparent to those skilled in the art. It is therefore to be understood that the present invention can be practiced otherwise than specifically described including systems and methods for adaptive EV charging without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An adaptive electric vehicle charging system, comprising:
    one or more electric vehicle supply equipment (EVSE);
    an adaptive electric vehicle (EV) charging platform, comprising:
        a processor; and
        a memory containing an adaptive EV charging application executable by the processor to:
            collect a plurality of EV charging parameters from the one or more EVSE,
            simulate EV charging control routines, and
            push out updated EV charging control routines to the one or more EVSE,
        wherein the adaptive EV charging platform is configured to control charging of EVs based upon the plurality of EV charging parameters collected from at least one EVSE, and
        wherein the EV charging parameters include an underlying distribution of EV arrival time, session duration, and energy delivered using Gaussian mixture models (GMMs).

2. The adaptive electric vehicle charging system of claim 1, wherein the GMMs are used to predict EV users' charging behavior.

3. The adaptive electric vehicle charging system of claim 1, wherein the adaptive EV charging application is further executable by the processor to use the GMMs to control charging of large numbers of EVs in order to smooth a difference in electricity demand and amount of available solar energy throughout the day (Duck curve).

4. The adaptive electric vehicle charging system of claim 1, wherein the adaptive EV charging application is further executable by the processor to train the GMMs based on a training dataset and predict a charging duration and energy delivered.

5. The adaptive electric vehicle charging system of claim 1, wherein the GMMs are population-level GMMs (P-GMM).

6. The adaptive electric vehicle charging system of claim 1, wherein the GMMs are individual-level GMMs (I-GMM).

7. The adaptive electric vehicle charging system of claim 1, further comprising a power distribution network.

8. The adaptive electric vehicle charging system of claim 1, wherein the plurality of EV charging parameters comprises EV driver laxity data.

9. The adaptive electric vehicle charging system of claim 1, wherein the adaptive EV charging application is further executable by the processor to:
    receive an EV request for charging,
    determine an amount of energy and a duration for delivering the amount of energy to the EV,
    optimize time-varying charging rate based on time of day and electric system load, and
    synchronize with one or more EVSE to deliver optimum charge to the EV.

10. An adaptive electric vehicle charging platform, comprising:
    a processor; and
    a memory containing an adaptive EV charging application executable by the processor to:
        collect a plurality of EV charging parameters from the one or more EVSE, simulate EV charging control routines, and push out updated EV charging control routines to the one or more EVSE,
        receive an EV request for charging,
        determine an amount of energy and a duration for delivering the amount of energy to the EV,
        optimize time-varying charging rate based on time of day and electric system load,
        synchronize with an electric vehicle charging station to deliver optimum charge to the EV, and
        learn an underlying distribution of EV arrival time, session duration, and energy delivered using Gaussian mixture models (GMMs).

11. The adaptive electric vehicle charging platform of claim 10, wherein the GMMs are used to predict EV users' charging behavior.

12. The adaptive electric vehicle charging platform of claim 10, wherein the adaptive EV charging application is further executable by the processor to train the GMMs based on a training dataset and predict a charging duration and energy delivered.

13. The adaptive electric vehicle charging platform of claim 10, wherein the adaptive EV charging application is further executable by the processor to learn an underlying model of an electric vehicle's battery charging behavior.

14. The adaptive electric vehicle charging platform of claim 10, wherein the adaptive EV charging application is further executable by the processor to learn battery models based on a training dataset, and to predict a maximum charging rate and threshold state of charge for a linear 2-stage battery model.

15. The adaptive electric vehicle charging platform of claim 10, wherein the adaptive EV charging application is further executable by the processor to use learned battery models to simulate EV charging control routines.

16. The adaptive electric vehicle charging platform of claim 10, wherein the adaptive EV charging application is further executable by the processor to use learned battery models to predict energy delivered.

* * * * *